United States Patent
del Pozo de Poza et al.

(10) Patent No.: US 9,087,452 B2
(45) Date of Patent: Jul. 21, 2015

(54) CONFLICT DETECTION AND RESOLUTION USING PREDICTED AIRCRAFT TRAJECTORIES

(71) Applicant: The Boeing Company, Chicago, IL (US)

(72) Inventors: Isabel del Pozo de Poza, Munich (DE); Miguel Vilaplana, Madrid (ES); Alfonso Valenzuela, Seville (ES); Rafael Vazquez, Seville (ES); Damian Rivas, Seville (ES)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 13/902,632

(22) Filed: May 24, 2013

(65) Prior Publication Data

US 2013/0317733 A1    Nov. 28, 2013

(30) Foreign Application Priority Data

May 25, 2012   (EP) .................................. 12382209

(51) Int. Cl.
G08G 5/04        (2006.01)
G06Q 10/04      (2012.01)
G08G 5/00        (2006.01)

(52) U.S. Cl.
CPC ............ G08G 5/045 (2013.01); G06Q 10/047 (2013.01); G08G 5/0013 (2013.01); G08G 5/0039 (2013.01); G08G 5/0043 (2013.01); G08G 5/0082 (2013.01)

(58) Field of Classification Search
CPC ....... G08G 5/04; G08G 5/045; G08G 5/0013; G08G 5/0026; G08G 5/0039; G08G 5/0043; G08G 5/0082; G06Q 10/047

USPC .......................................................... 701/123
See application file for complete search history.

(56) References Cited

U.S. PATENT DOCUMENTS

| | | | |
|---|---|---|---|
| 6,885,340 B2 | 4/2005 | Smith et al. | |
| 6,950,037 B1 | 9/2005 | Clavier et al. | |
| 7,623,957 B2 | 11/2009 | Bui et al. | |
| 8,560,148 B2 | 10/2013 | Torres et al. | |

(Continued)

FOREIGN PATENT DOCUMENTS

EP         2040137 A1       3/2009

OTHER PUBLICATIONS

Valenzuela et al., "Conflict Resolution in Converging Air Traffic Using Trajectory Patterns," Journal of Guidance, Control and Dynamics, Jul. 1, 2011.*

(Continued)

*Primary Examiner* — Fadey Jabr
*Assistant Examiner* — Courtney Heinle
(74) *Attorney, Agent, or Firm* — Yee & Associates, P.C.

(57) ABSTRACT

A method of detecting conflicts between aircraft passing through managed airspace, and to resolving the detected conflicts strategically. The method may include obtaining intended trajectories of aircraft through the airspace and time constraints corresponding to time of arrival at specified locations, detecting conflicts in the intended trajectories, forming a set of the conflicted aircraft, calculating one or more revised trajectories for the conflicted aircraft such that the conflicts are resolved and the time constraints met, and advising the conflicted aircraft subject to revised trajectories of the revised trajectories.

20 Claims, 16 Drawing Sheets

(56) References Cited

U.S. PATENT DOCUMENTS

| | | | |
|---|---|---|---|
| 8,594,917 B2 | 11/2013 | Sawhill et al. | |
| 2005/0156777 A1 | 7/2005 | King et al. | |
| 2006/0146048 A1 | 7/2006 | Wright et al. | |
| 2007/0222665 A1 | 9/2007 | Koeneman | |
| 2008/0059052 A1 | 3/2008 | Bui et al. | |
| 2009/0012660 A1 | 1/2009 | Roberts et al. | |
| 2010/0215435 A1 | 8/2010 | Luo et al. | |
| 2010/0241345 A1 | 9/2010 | Cornell et al. | |
| 2010/0305781 A1* | 12/2010 | Felix | 701/3 |
| 2011/0077803 A1 | 3/2011 | Dehais et al. | |
| 2011/0118981 A1 | 5/2011 | Chamlou | |
| 2012/0004837 A1* | 1/2012 | McDonald | 701/120 |
| 2012/0083946 A1 | 4/2012 | Maldonado et al. | |
| 2012/0083997 A1 | 4/2012 | Meador et al. | |
| 2012/0116614 A1 | 5/2012 | Torres et al. | |
| 2012/0158219 A1 | 6/2012 | Durling et al. | |
| 2012/0303253 A1 | 11/2012 | Irfan et al. | |
| 2013/0085661 A1 | 4/2013 | Chan et al. | |
| 2013/0317734 A1 | 11/2013 | Vilaplana et al. | |
| 2013/0332059 A1 | 12/2013 | del Pozo de Poza | |
| 2013/0338909 A1 | 12/2013 | Garcia de Blanes et al. | |
| 2013/0338910 A1 | 12/2013 | Vilaplana et al. | |

OTHER PUBLICATIONS

Hagen et al., "Stratway: A Modular Approach to Strategic Conflict Resolution," NASA Langley Research Center, Jan. 1, 2011.*

Pallottino et al., "Conflict Resolution Problems for Air Traffic Management Systems Solved with Mixed Integer Programming," IEEE Transactions on Intelligent Transportation Systems, vol. 1, No. 1, Mar. 2002, pp. 3-11.

Office Action, dated Jul. 17, 2014, regarding U.S. Appl. No. 13/902,697, 34 pages.

Office Action, dated Sep. 10, 2014, regarding U.S. Appl. No. 13/902,501, 29 pages.

European Search Report, dated Dec. 20, 2012, regarding Application No. EP12382208.2, 15 pages.

Partial European Search Report, dated Dec. 18, 2012, regarding Application No. EP12382206.6, 10 pages.

European Search Report, dated Dec. 20, 2012, regarding Application No. EP12382209.0, 11 pages.

European Search Report, dated Dec. 20, 2012, regarding Application No. EP12382210.8, 16 pages.

Bertsimas et al., "Fairness in Air Traffic Flow Management," Proceedings of the INFORMS Annual Meeting, Vo. 32, No. 4, Oct. 2009, 27 pages.

Casado, "Application of the Theory of Formal Languages to the Modeling of Trajectory Uncertainty and the Analysis of its Impact in Future Trajectory-Based Operations," First SESAR Innovation Days, Nov. 2011, 1 page. Retrieved May 2, 2013, http://sesarinnovationdays.eu/files/Posters/SID%202011%20Enrique%20Casado.pdf.

Del Pozo De Poza et al., "Assessing Fairness and Equity in Trajectory Based Operations," Proceedings of the 9th AIAA Aviation Technology, Integration, and Operations Conference (ATIO), Sep. 2009, 18 pages.

Galdino et al., "Formal Verification of an Optimal Air Traffic Conflict Resolution and Recovery Alogrithm," Lecture Notes in Computer Science, vol. 4576, Proceedings of the 14th International Workshop on Logic, Language, Information, and Computation (WoLLIC 2007), Jul. 2007, pp. 177-188.

Gallo, "Prediction of Descent Trajectories Based on Aircraft Intent," Proceedings of the 29th IEEE/AIAA Digital Avionics Systems Conference (DASC), Oct. 2010, 16 pages.

Hagen et al., "Stratway—A Modular Approach to Strategic Conflict Resolution," Proceedings of the 11th AIAA Aviation, Technology, Integration, and Operations (ATIO) Conference, Sep. 2011, 13 pages.

Jonker et al., "Efficiency and Fairness in Air Traffic Control," Proceedings of the Seventeenth Belgium-Netherlands Conference on Artificial Intelligence (BNAIC 2005), Oct. 2005, 7 pages.

Karr et al., "Experimental Performance of a Genetic Algorithm for Airborne Strategic Conflict Resolution," Proceedings of the AIAA Guidance, Navigation, and Control Conference, Aug. 2009, 15 pages.

Kuchar et al., "A Review of Conflict Detection and Resolution Modeling Methods," IEEE Transactions on Intelligent Transportation Systems, vol. 1, No. 4, Dec. 2000, pp. 179-189.

Lopez et al., "Towards an Open Test bed for the Study of Trajectory Synchronization in the Future ATM System: The ASIS Initiative," Proceedings of the 2009 Integrated Communications, Navigation, and Surveillance Conference (ICNS '09), May 2009, 14 pages.

Prandini et al., "A Probabilistic Approach to Aircraft Conflict Detection," IEEE Transactions on Intelligent Transportation Systems, vol. 1, No. 4, Dec. 2000, pp. 199-220.

Pourtaklo et al., "Equitable Allocation of Enroute Airspace Resources," Proceedings of the Eighth USA/Europe Air Traffic Management Research and Development Seminar (ATM2009), Jun. 2009, 8 pages.

Ranieri et al., "STREAM—Strategic Trajectory de-confliction to Enable seamless Aircraft conflic Management," First SESAR Innovation Days, Nov. 2011, 8 pages.

Soomers et al., "Fairness in the Aircraft Landing Problem," Proceedings of the 2008 AGIFORS Anna Valicek Medal Competition, Jun. 2008, 19 pages.

Valenzuela et al., "Conflict Resolution in Converging Air Traffic Using Trajectory Patterns," Journal of Guidance, Control, and Dynamics, vol. 34, No. 4, Jul.-Aug. 2011, pp. 1172-1189.

Vilaplana, "Intent Synchronization," Eurocontrol/FAA Workshop on Avionics for 2011 and Beyond, Oct. 2005, 19 pages. Retrieved May 2, 2013, http://www.ecacnav.com/downloads/13.%20INTENT%20SYNC%202005-10-07%20M%20Vilaplana.pdf.

Vivona et al., "Pattern-Based Genetic Algorithm for Airborne Conflict Resolution," Proceedings of the AIAA Guidance, Navigation, and Control Conference and Exhibit, Aug. 2006, pp. 316-338.

Wing et al., "Airborne Tactical Intent-Based Conflict Resolution Capability," Proceedings of the 9th AIAA Aviation, Technology, Integration, and Operations (ATIO) Conference, Sep. 2009, 12 pages.

European Search Report, dated Jul. 4, 2013, regarding Application No. EP12382206.6, 14 pages.

Del Pozo De Poza, "Conflict Detection and Resolution Using Predicted Aircraft Trajectories", U.S. Appl. No. 13/902,501 and Preliminary Amendment, filing date May 24, 2013, 94 pages.

Garcia De Blanes et al., "Conflict Detection and Resolution Using Predicted Aircraft Trajectories", U.S. Appl. No. 13/902,568 and Preliminary Amendment, filing date May 24, 2013, 85 pages.

Vilaplana et al., "Conflict Detection and Resolution Using Predicted Aircraft Trajectories", U.S. Appl. No. 13/902,672 and Preliminary Amendment, filed May 24, 2013, 80 pages.

Vilaplana et al., "Conflict Detection and Resolution Using Predicted Aircraft Trajectories", U.S. Appl. No. 13/902,697 and Preliminary Amendment, filed May 24, 2013, 85 pages.

Office Action, dated Mar. 20, 2014, regarding U.S. Appl. No. 13/902,568, 23 pages.

Notice of Allowance, dated May 20, 2014, regarding U.S. Appl. No. 13/902,568, 5 pages.

Final Office Action, dated Nov. 28, 2014, regarding U.S. Appl. No. 13/902,697, 20 pages.

Notice of Allowance, dated Oct. 10, 2014, regarding U.S. Appl. No. 13/902,501, 8 pages.

Office Action, dated Jan. 8, 2015, regarding U.S. Appl. No. 13/902,632, 35 pages.

Notice of Allowance, dated Feb. 6, 2015, regarding USPTO Application No. 13/902,672, 12 pages.

* cited by examiner understand# CONFLICT DETECTION AND RESOLUTION USING PREDICTED AIRCRAFT TRAJECTORIES

PRIORITY STATEMENT

This application claims the benefit of EP Patent Application No. 12382209.0, filed on May 25, 2012, the disclosure of which is incorporated herein by reference in its entirety.

CROSS REFERENCE TO RELATED APPLICATIONS

This application is related to and incorporates herein by reference in its entirety, co-pending U.S. patent application Ser. No. 13/902,672, concurrently filed and entitled "Conflict Detection and Resolution Using Predicted Aircraft Trajectories" which claims priority to EP Patent Application No. 12382207.4, filed on May 25, 2012 in the European Patent Office.

This application is related to and incorporates herein by reference in its entirety, co-pending U.S. patent application Ser. No. 13/902,697, concurrently filed and entitled "Conflict Detection and Resolution Using Predicted Aircraft Trajectories" which claims priority to EP Patent Application No. 12382208.2, filed on May 25, 2012 in the European Patent Office.

This application is related to and incorporates herein by reference in its entirety, co-pending U.S. patent application Ser. No. 13/902,568, concurrently filed and entitled "Conflict Detection and Resolution Using Predicted Aircraft Trajectories" which claims priority to EP Patent Application No. 12382206.6, filed on May 25, 2012 in the European Patent Office.

FIELD OF THE DISCLOSURE

This disclosure relates to automating the management of airspace. In particular, the present disclosure is concerned with detecting conflicts between aircraft passing through managed airspace, and to resolving the detected conflicts strategically.

BACKGROUND TO THE DISCLOSURE

Air traffic management is responsible for the safe passage of aircraft through an airspace. The aircraft may be manned or unmanned. To do this, a centralized, ground-based air traffic management facility must communicate with aircraft flying through the airspace it manages. This two-way communication may be done in a number of ways, including by oral communication such as by radio or by data communication through a data link or the like.

The aircraft may determine their desired flight path through the airspace, for example using an airborne flight management system, and may then communicate this to air traffic management. In modern times, air traffic management uses sophisticated computer systems to check the submitted flight paths do not result in aircraft trajectories that give rise to conflicts. Conflicts between aircraft arise when their intended trajectories would result in a separation falling below the minimum specified. By trajectory, a four-dimensional description of the aircraft's path is meant such as a time-ordered sequence of aircraft states, including position and altitude. Maintaining safe separations is a particularly demanding task, particularly in congested airspace such as around airports where flight paths tend to converge.

In addition to detecting conflicts, air traffic management must have the means to be able to resolve the conflicts and to communicate the necessary changes in trajectories to the conflicted aircraft.

To date, most efforts aimed at air traffic management's ability to detect and resolve air traffic conflicts have focused on crossing traffic patterns and have not dealt with the more challenging problem of converging traffic. This arises, for example, in arrivals management at TRACON (terminal radar control) facilities, where aircraft arrive from many directions and must be sequenced for approach and landing at an airport. The efforts directed to converging traffic consider maximizing the throughput of traffic on an airspace resource such as a sector or a runway as the main or sole objective when solving air traffic conflicts. Existing solutions also focus on planning the arrival sequence first before detecting and resolving conflicts. The method then proceeds by extrapolating that sequence backwards to the earlier waypoints. However, such an approach only serves to propagate the delay backwards to all other aircraft.

Previous attempts at detecting and resolving conflicts suffer other problems. For example, previous attempts have analyzed conflicts in isolation from each other, typically as isolated events between pairs of aircraft. The detected conflicts are resolved in a sequential manner without any consideration of the possibility of a "domino effect" feeding back delays.

Recent advances in predicting aircraft trajectories accurately are of benefit to air traffic management. In particular, work on expressing aircraft intent using formal languages provides a common platform for the exchange of flight information and allows different interested parties to perform trajectory calculations. For example, this aids the communication of planned trajectories between aircraft and air traffic management.

EP patent application 07380259.7, published as EP-A-2,040,137, also in the name of The Boeing Company, describes the concept of aircraft intent in more detail, and the disclosure of this application is incorporated herein in its entirety by reference. In essence, aircraft intent is an expression of the intent of how the aircraft is to be flown. The aircraft intent is expressed using a set of parameters presented so as to allow equations of motion governing the aircraft's flight to be solved. The theory of formal languages may be used to implement this formulation. An aircraft intent description language provides the set of instructions and the rules that govern the allowable combinations that express the aircraft intent, and so allow a prediction of the aircraft trajectory.

Flight intent may be provided as an input to an intent generation infrastructure. The intent generation infrastructure may be airborne on an aircraft or it may be land-based such as an air traffic management facility. The intent generation infrastructure determines aircraft intent using the unambiguous instructions provided by the flight intent and other inputs to ensure a set of instructions is provided that will allow an unambiguous trajectory to be calculated. Other inputs may include preferred operational strategies such as preferences with respect to loads (both payload and fuel), how to react to meteorological conditions, preferences for minimizing time of flight or cost of flight, maintenance costs, and environmental impact. In addition, other inputs may include constraints on use of airspace to be traversed.

The aircraft intent output by the intent generation infrastructure may be used as an input to a trajectory computation infrastructure. The trajectory computation infrastructure may be either located with or away from the intent generation infrastructure. The trajectory computation infrastructure may comprise a trajectory engine that calculates an unambiguous trajectory using the aircraft intent and other inputs that are required to solve the equations of motion of the aircraft. The other inputs may include data provided by an aircraft performance model and an Earth model. The aircraft performance model provides the values of the aircraft performance aspects required by the trajectory engine to integrate the equations of motion. The Earth model provides information relating to environmental conditions, such as the state of the atmosphere, weather conditions, gravity and magnetic variation.

SUMMARY OF THE DISCLOSURE

Against this background, and from a first aspect, the present invention resides in a computer-implemented method of managing airspace through which a plurality of aircraft are flying. The method comprises obtaining user-preferred aircraft intents of the aircraft that describe unambiguously the user-preferred trajectories of the aircraft through the airspace. The user-preferred aircraft intents are expressed in a formal language, for example using an aircraft intent description language as described in EP-A-2,040,137 the contents of which are incorporated herein in their entirety.

Time constraints are obtained for at least some of the aircraft, each time constraint comprising a user-preferred time of arrival at a specified location.

The user-preferred aircraft intents obtained for the aircraft are used to calculate the corresponding user-preferred trajectories. Then, an initial conflict detection process is called in which the calculated trajectories are compared and any conflicts identified, along with the conflicted aircraft predicted to fly the detected conflicting trajectories.

An initial conflict resolution process is called in which the user-preferred aircraft intent data of one or more of the conflicted aircraft is revised, thus leading to corresponding revised trajectories. The method also comprises transmitting to the conflicted aircraft subject to revised trajectories the one or more revised aircraft intents.

This method allows time constraints to be met because aircraft intents are revised according to at least two tiered objectives: a primary objective to remove conflicts, thereby ensuring safe passage of the aircraft through the airspace, and a secondary objective to meet the time constraints. Thus, once safety is assured, trajectories are derived that target meeting the submitted time constraints.

In some embodiments, all aircraft flying through the airspace will provide time constraints, although in other embodiments some aircraft do not provide time constraints. These aircraft may be included in this method still: their aircraft intent data will be amended as required to avoid conflicts and no amendments need be made to meet a time constraint as one does not exist.

The method may comprise predicting the user-preferred trajectories. For example, the user-preferred trajectories may be predicted from a description of flight intent or aircraft intent that may be expressed using a formal language. The method may alternatively be based on obtaining the user-preferred trajectories and/or time constraints directly from the aircraft, for example via air-ground data link communications.

The user-preferred aircraft intents and time constraints may be obtained in different ways. For example, the user-preferred aircraft intents and/or time constraints may be transmitted by the aircraft, such that the method comprises receiving the user-preferred aircraft intents and/or time constraints transmitted by the airborne aircraft. The user-preferred aircraft intents may be communicated in any number of ways, including via air-ground data link communications.

Time constraints may be obtained in the same way. Alternatively, the user-preferred aircraft intents and/or time constraints may be obtained from the airline operating the aircraft. The aircraft may have filed the user-preferred aircraft intent and/or time constraints prior to departure from its source airport.

Detecting conflicts may comprise calculating the position of each aircraft at a sequence of points in time. For each point in time, the positions of pairs of aircraft may be compared to detect conflicts. For example, the distance between the aircraft may be calculated. The distances may be checked against pre-defined separation minimum, and conflicts detected based upon the distance dropping below the minimum. The lateral and vertical distance between aircraft may be calculated, and conflicts may be detected using one or both of the lateral and vertical distances.

Rather than repeatedly calculating distances between a pair of aircraft at each time step of the calculation, predictive methods may be employed. For example, the velocity of the aircraft may be used to determine that the aircraft will not be in conflict for a forthcoming length of time.

In the initial conflict resolution procedure, the user-preferred aircraft intent of one of more conflicted aircraft is revised in order to remove conflicts. It is usually not necessary to amend the aircraft intents of all the aircraft identified as being in conflicts. If a pair of aircraft are in conflict, the aircraft intent of just one of the aircraft may be amended such that the conflict is removed. Hence, the method may comprise amending aircraft intent of some, but not all, aircraft identified as being in conflicts. The aircraft intent data of conflicted aircraft may be amended in turn until all conflicts are removed.

As mentioned above, user-preferred aircraft intent data is revised according to two tiered objectives. The first tiered objective of removing conflicts may be addressed by calling an initial avoidance procedure. In the initial avoidance procedure, the user-preferred aircraft intent data of one or more conflicted aircraft is revised. Then, the second objective of meeting time constraints is addressed by calling a recovery procedure comprising determining if the user-preferred times of arrival are met by the revised trajectories. If a revised trajectory is found not to meet the user-preferred time of arrival, the associated revised aircraft intent data is further revised in a way that should achieve the secondary objective of meeting the time constraints. This, in the first step, conflicts are removed in a way that may pay no regard to meeting the time constraints. Then, having achieved a conflict-free revised trajectory, the associated revised aircraft intent data is further revised to improve how well it meets the time constraint.

Computational advantages may be achieved by processing aircraft in turn, starting with the aircraft having the earliest user-preferred time of arrival, and then moving onto the aircraft with the next earliest time of arrival, and so on. This may allow a consideration of only the preceding aircraft, reducing the computations necessary for each aircraft.

For example, the method may comprise ordering the aircraft according to their user-preferred times of arrival, in order of increasing lateness of time of arrival. Then, the initial conflict resolution procedure may comprise processing each aircraft from the list in turn. The processing of each aircraft may comprise determining if the aircraft is conflicted and, if the aircraft is conflicted, calling the initial avoidance and recovery procedures.

Aircraft intent data may be revised in such a way that it inherently removes conflicts. In other embodiments, the revised trajectories may be checked in a further conflict detection procedure to ensure conflicts are removed: if conflicts are found, a further avoidance procedure may be called.

Accordingly, the method may use a further conflict detection procedure comprising comparing calculated trajectories, including both the revised trajectories of aircraft subject to revised aircraft intent data and the user-preferred trajectories of the aircraft not subject to revised aircraft intent data, to identify any conflicts between trajectories. If conflicts are identified during the further conflict detection procedure, the further conflict detection procedure may further comprise identifying the still-conflicted aircraft and calling a further avoidance procedure. Alternatively, if conflicts are not detected during the further conflict detection procedure, the method may continue either to call the recovery procedure or, if the further conflict detection procedure was called by the recovery procedure or an optimisation procedure, to the next step of the method as is appropriate.

Furthermore the method may use a further avoidance procedure comprising revising the user-preferred aircraft intent data of one or more still-conflicted aircraft in at least a partially random way, and calculating the corresponding revised trajectories. As new trajectories will arise, the further avoidance procedure also comprises calling a further round of the further conflict detection procedure to check that the trajectories are conflict free. As will be appreciated, the procedures may loop from further avoidance procedure to further conflict detection procedure and so on, all the while conflicts are present. As will be understood, these procedures will loop until a set of conflict free trajectories is achieved. During further avoidance procedures, it is the user-preferred aircraft intent data that is revised, such that another attempt at proposing a conflict-free trajectory begins from the same starting point rather than continuing from a failed revised trajectory. As the aircraft intent data is revised in an at least partially random way, a different revised trajectory should result, that will hopefully not give rise to further conflict or time of arrival problems.

The method may comprise processing each aircraft in order according to their user preferred times or arrival, as described above, wherein processing each aircraft comprises the following steps. The initial avoidance procedure may be called, when necessary. In the initial avoidance procedure, the user-preferred aircraft intent data of the aircraft is revised in at least a partially random way. The corresponding revised trajectory may be calculated from the revised aircraft intent data, and the further conflict detection procedure may be called. Once the further conflict detection procedure is passed, i.e. once the further conflict detection/further avoidance procedure loop indicates that the trajectories are conflict free, the method continues by calling the recovery procedure.

In the recovery procedure, it is determined whether the user-preferred times of arrival are met by the revised trajectories. If not, the revised aircraft intent data of the associated aircraft is further revised in a way that minimizes the difference between the revised time of arrival and the user-preferred time of arrival. This sees the revised time or arrival moved as close as possible to the user-preferred time of arrival. As new trajectories result from the further revision of the aircraft intent data, the further conflict detection procedure is called once more. Thus, the further conflict detection loop is entered once more. If no conflicts are found, the method may continue, for example to the step of transmitting revised trajectories to aircraft or to an optimisation step that is described below. However, if new conflicts arise, the method enters the further avoidance and further conflict detection loops described above. The method could return to further revision according to the recovery procedure to try to remove the conflict. However, it is preferred for the method to continue in the further avoidance and further conflict detection loops described above that sees the user-preferred aircraft intent data revised and new avoidance and recovery procedures performed. The user of at least partially random revisions of the aircraft intent data ensures a different revised trajectory is generated that will hopefully see a better result emerge.

Optionally, the further conflict detection procedure comprises identifying any conflicts between trajectories by comparing the revised trajectory of the aircraft currently being processed with the calculated trajectories of conflict-free aircraft and only the conflicted aircraft already processed. The calculated trajectories include both the revised trajectories of aircraft subject to revised aircraft intent data and the user-preferred trajectories of the aircraft not subject to revised aircraft intent data. Thus, the computation required for each aircraft is reduced as it does not concern itself with later-arriving aircraft. Thus, the method becomes iterative in that an overall solution is achieved by starting with the earliest aircraft and moving through the aircraft in turn, each time adding the aircraft with revisions to their aircraft intent data if needed to maintain the conflict free network. This makes the method computationally efficient.

A further improvement may be obtained by ensuring that the aircraft is not predicted to "overtake" the preceding aircraft during the revision process. That is, the order of arrival should be preserved. To this end, the method may comprise an order of arrival check procedure. This procedure may comprise identifying order of arrival errors by comparing the revised trajectory of the aircraft currently being processed with the calculated trajectory of the preceding aircraft to identify instances where the aircraft currently being processed is predicted to arrive at the common location before the preceding aircraft. If a conflict and/or an order of arrival error is identified during the further conflict detection procedure, further revision of the aircraft intent data is required and so the further avoidance procedure is called. Alternatively, if neither a conflict nor an order of arrival error is detected during the further conflict detection procedure, the method may continue either to call the recovery procedure or, if the further conflict detection procedure was called by the recovery procedure, continuing to the step of transmitting revised trajectories.

Randomness may be introduced into the revisions to the aircraft intent data in different ways. For example, aircraft intent data may be revised using a randomly generated parameter such as speed, altitude or position. That is, the parameter itself may be chosen in a random way (e.g. select speed or altitude or position to be changed) or the value of the parameter may be varied randomly (e.g. increase speed by x % where x is a randomly generated).

The revision may be partially random rather than wholly random. For example, suitable strategies may be selected that will address the cause of the conflict, but which particular suitable strategy is selected and how it is implemented may be random.

To this end, the method may comprise revising aircraft intent data by selecting a candidate resolution strategy from predefined templates including templates that define: increasing speed, decreasing speed, shortening a trajectory by removing a waypoint, lengthening a trajectory by adding a waypoint, increasing altitude and decreasing altitude. The selection may be random. To guide the revision to a better trajectory that is likely to remove the conflict, the method may comprise determining if a conflict arises because the aircraft being processed is catching up with the preceding aircraft or is being caught up by the following aircraft. If the aircraft being processed is catching up the preceding aircraft, the method may comprise selecting, optionally randomly selecting, a candidate resolution strategy from a set of predefined templates including templates that define decreasing speed and lengthening a trajectory by adding a waypoint. If the aircraft being processed is being caught up by the following aircraft, the method may comprise selecting, optionally randomly selecting, a candidate resolution strategy from a set of predefined templates including templates that define increasing speed, and shortening a trajectory by removing a waypoint.

Optionally, the method may comprise an additional, optimisation procedure. This procedure may comprise further revising revised aircraft intent data of one or more aircraft to minimize a cost function calculated from revised aircraft intent data, and calling the further conflict detection procedure. This third type of aircraft intent data is supplemental to the conflict removal of the avoidance procedure and the time or arrival improvement of the recovery procedure. The optimisation procedure is used to target a cost function that may vary according to need or desire.

The cost function may be a global function of the network that reflects all the aircraft. Then, the method may comprise performing the optimisation procedure as a global function that considers all revised aircraft data globally. For example, the cost function may be calculated from all revised aircraft intent data as a measure of how unfairly or inequitably deviations in revised trajectories are spread amongst aircraft subject to revised aircraft intent data. This may help distribute revisions between aircraft such that more aircraft see minor revisions rather than ending up with a few aircraft seeing major revisions.

Alternatively, the cost function may be local to the aircraft being currently processed. Then, processing of each aircraft comprises an additional, optimisation procedure that comprises further revising the revised aircraft intent data of the aircraft being processed to minimize a cost function calculated from revised aircraft intent data. For example, the cost function may be a measure of how much the revised trajectory deviates from the user-preferred trajectory or, more specifically, how much the lateral path defined by the revised aircraft intent data deviates from the lateral path defined by the user-preferred aircraft intent data.

The present disclosure may be used with air traffic control in a terminal airspace. In this example, the time constraint may be a planned time of arrival for the aircraft.

The present disclosure also extends to a computer apparatus programmed to implement any of the methods described above, and to an air traffic control apparatus comprising such a computer apparatus. The present disclosure also resides in a computer program comprising instructions that when executed on a computer, cause the computer to perform any of the methods described above and to computer readable medium having stored therein such a computer program.

BRIEF DESCRIPTION OF THE DRAWINGS

In order that the present disclosure may be more readily understood, preferred embodiments will now be described, by way of example only, with reference to the accompanying drawings in which.

DETAILED DESCRIPTION OF THE DISCLOSURE

The present disclosure provides methods and systems that enable a ground-based airspace management system to de-conflict strategically the trajectories of aircraft under its responsibility, regardless of whether the aircraft are manned or unmanned, in any traffic scenario including converging traffic patterns.

System Overview

Figure 1:
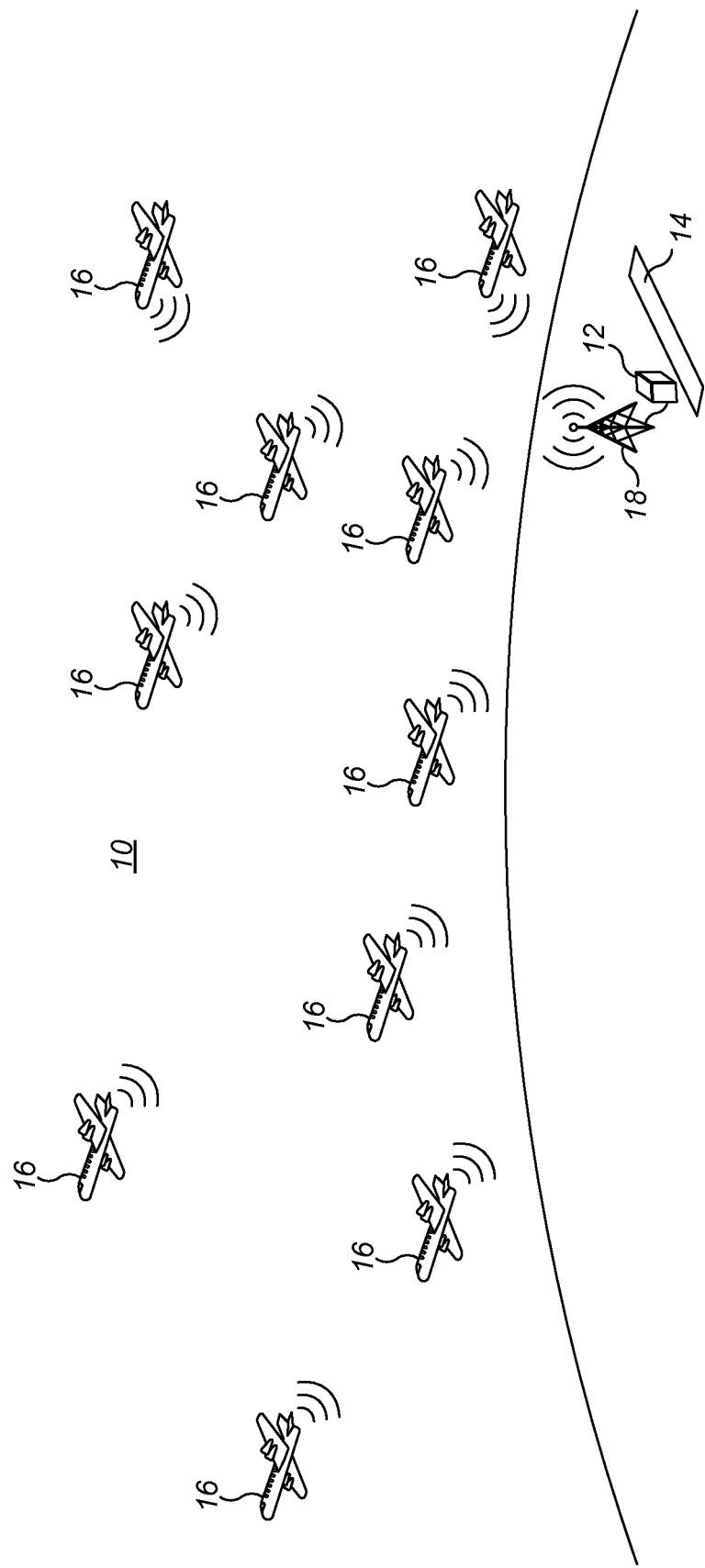
FIG. 1 is a schematic diagram showing aircraft flying within an airspace managed by an air traffic management facility.

FIG. 1 shows schematically an airspace 10 under the control of air traffic management facility 12. In this example, air traffic management 12 is located at an airport 14 and is responsible for aircraft 16 arriving and departing from the airport 14, as well as those aircraft 16 passing through the airspace 10.

Air traffic management 12 is provided with associated communication means 18 to allow two-way communication with the aircraft 16 flying through the airspace 10. The aircraft 16 are equipped with complementary communication equipment (not shown in FIG. 1) of any type well known in the field of aerospace. For example, communication may be effected by radio or could be effected using a data link such as ADS-B.

Communication between air traffic management 12 and each of the aircraft 16 is generally the same, and may be effected either in parallel or serially. A framework illustrating the relationship between air traffic management 12 and one of the aircraft 16 will now be described in more detail. It is to be understood that this framework is common to all the aircraft in the sense that it is the same for any aircraft 16 chosen to be considered.

Figure 2:
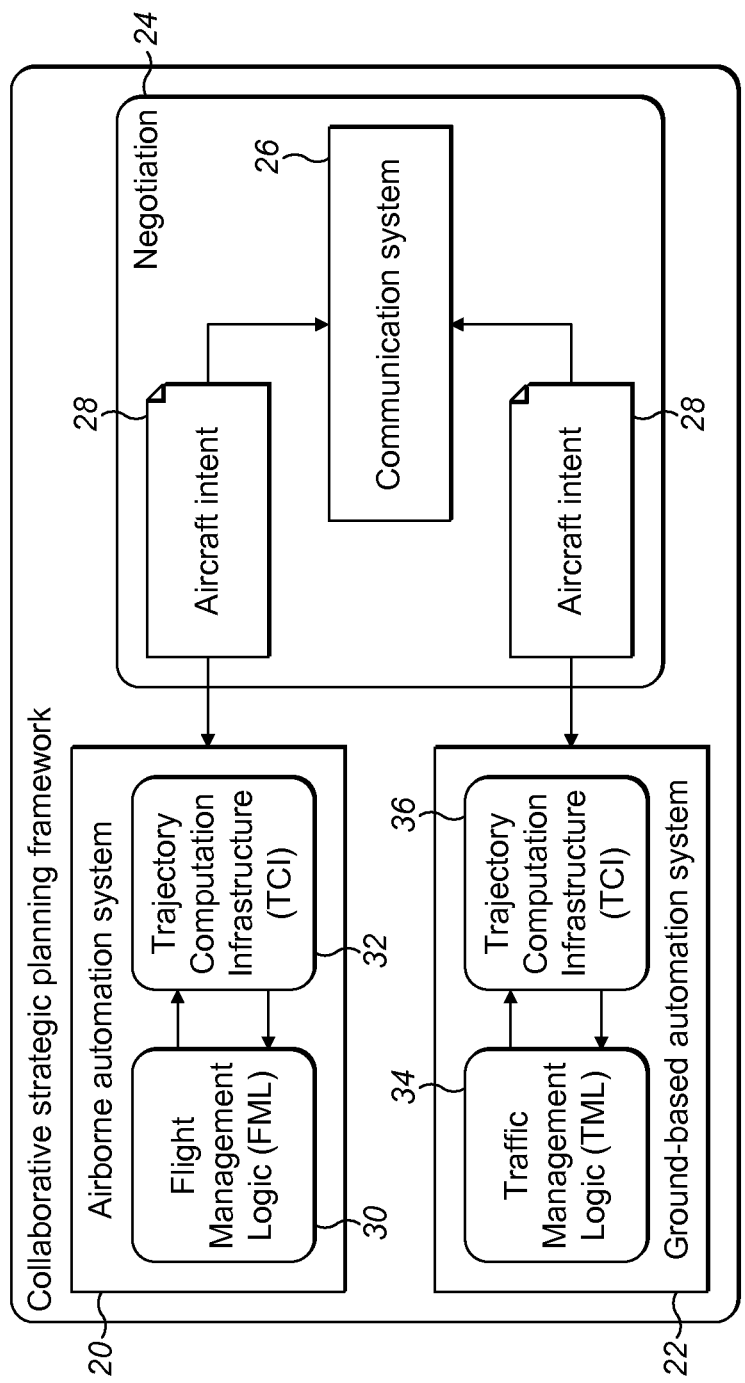
FIG. 2 shows a framework illustrating the relationship between air traffic management and an aircraft flying within the airspace it manages that allows conflict detection and resolution.

FIG. 2 shows schematically the airborne system 20, the ground-based system 22, and the negotiation process 24 that occurs between the airborne system 20 and ground-based system 22. Airborne system 20 is provided by the aircraft 16, and the ground-based system 22 is provided by air traffic management facility 12. The negotiation process 24 requires a communication system 26 that is distributed between the aircraft 16 and air traffic management 12, namely a transmitter/receiver provided on the aircraft 16 and the communication means 18 provided at the air traffic management facility 12.

In the example of FIG. 2, the communication system 26 is used to exchange aircraft intent data 28 between the airborne automation system 20 and the ground-based automation system 22. The aircraft intent data 28 may be provided by the airborne automation system 20 or by the ground-based automation system 22. The aircraft intent data 28 provided by the airborne automation system 20 will correspond to the user-preferred trajectory of the aircraft 16, whereas the aircraft intent data 28 provided by the ground-based automation system 22 will correspond to a revised trajectory determined by air traffic management 12.

The airborne automation system 20 comprises flight management logic 30 and trajectory computation infrastructure 32. Both these components are computer-implemented, preferably as separate computer systems. For example, the flight management logic 30 may be part of a flight computer of the aircraft 16.

The flight management logic 30 is responsible for following and supervising the negotiation process 24 from the aircraft's point of view. The flight management logic 30 is also responsible for defining the user-preferred aircraft intent data 28 and agreeing the revised aircraft intent 28 with the ground-based automation system 22.

The trajectory computation infrastructure 32 is responsible for computing the trajectory resulting from a given flight intent 28. For example, it may calculate the trajectory arising from a user-preferred aircraft intent for presentation to a pilot for approval before the corresponding user-preferred aircraft intent data 28 is provided to the ground-based automation system 22. Additionally, the trajectory computation infrastructure 32 may generate and display a trajectory corresponding to revised aircraft intent data 28 provided by the ground-based automation system 22 such that the pilot may approve the revised trajectory.

The ground-based automation system 22 comprises traffic management logic 34 and trajectory computation infrastructure 36. Both these components are computer-implemented, preferably as separate computer systems. Although the trajectory computation infrastructure 36 performs a similar function to the trajectory computation infrastructure 32 of the airborne automation system 20, it need not be the same and may be implemented differently.

The traffic management logic 34 is responsible for following and supervising the negotiation process 24. The traffic management logic 34 is also responsible for revising aircraft intents where conflicts arise. To enable revision of the aircraft intents, the traffic management logic 34 has at its disposal algorithms relating to a look ahead process that governs when to run a conflict detection process, to conflict detection and to conflict resolution. In this example, the traffic management logic 34 is modular in its nature such that any of the algorithms may be varied or entirely replaced without affecting the other algorithms. This modularity also makes the traffic management logic 34 ideal as a test bed for developing improved algorithms in that revised versions of the algorithm may be readily swapped in and out of the traffic management logic 34.

The trajectory computation infrastructure 36 is responsible for generating trajectories corresponding to aircraft intents at the ground-based automation system 22. The aircraft intent may be the user-preferred aircraft intent 28 received from the airborne automation system 20 or the revised aircraft intent 28 determined by the traffic management logic 34.

Figure 3:
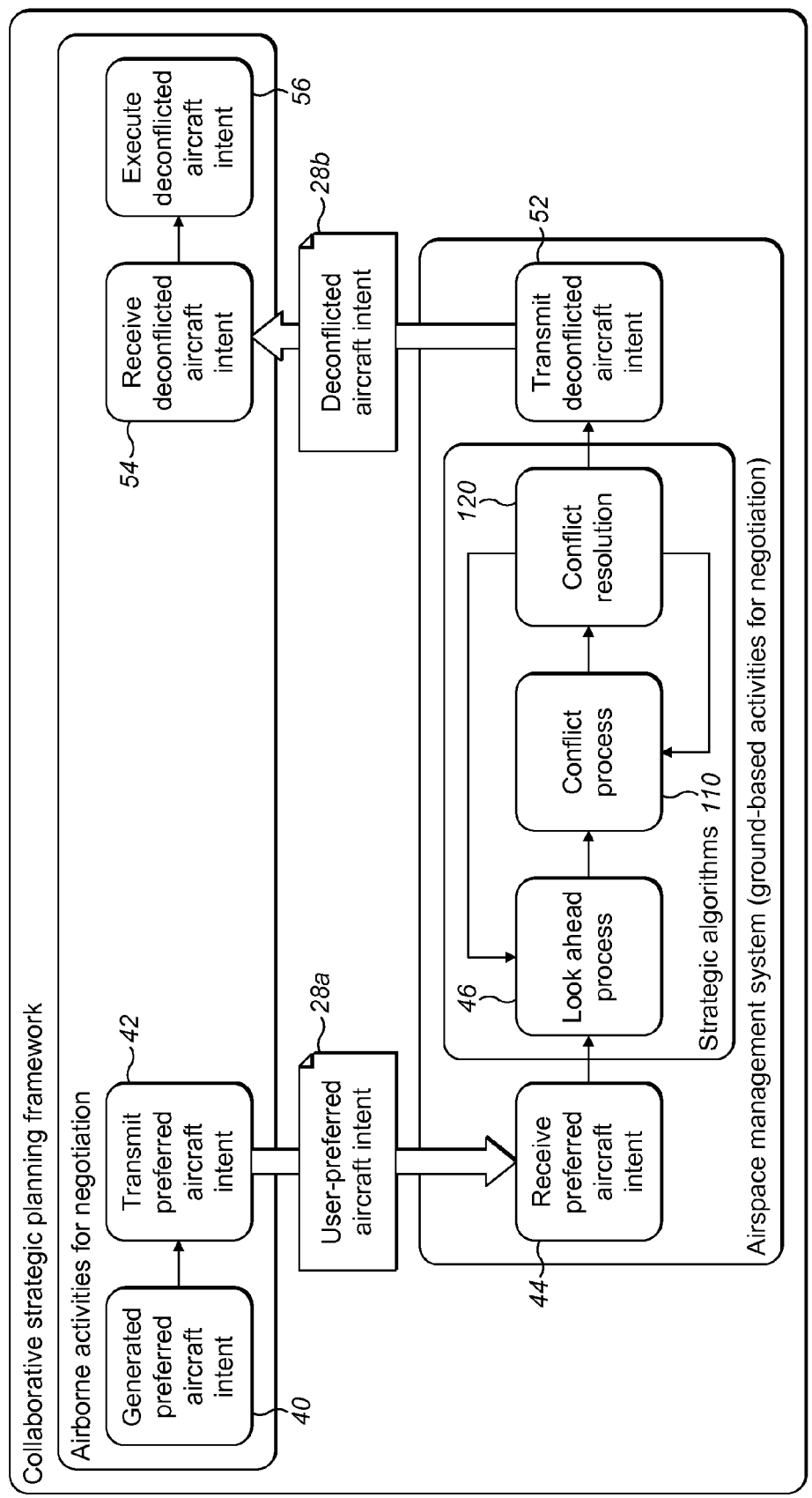
FIG. 3 is a schematic representation of a negotiation process between an aircraft an air traffic management.

The negotiation process 24 defines the type of information to be shared between the airborne automation system 20 and ground-based automation system 22. The negotiation process 24 also defines who is to start communication according to what events, and the sequence of decisions to be followed in order to agree upon a revised aircraft intent 28. FIG. 3 shows the steps of the negotiation process 24, and will now be described in more detail.

In this example, the negotiation process 24 starts on-board the aircraft 16 with the definition of the aircraft's intent that corresponds to a user-preferred trajectory. This is shown in FIG. 3 at 40. The aircraft 16 establishes contact with air traffic management 12 and transmits the user-preferred trajectory information 42 expressed as the user-preferred aircraft intent data 28a to air traffic management 12.

Once the user-preferred aircraft intent data 28a has been received, the aircraft 16 and air traffic management 12 engage in a one-to-one negotiation process. During the negotiation process 24, the user-preferred aircraft intent data 28a submitted by the aircraft 16 is used by the trajectory computation infrastructure 36 to produce the corresponding trajectory. This user-preferred trajectory is analyzed by the traffic management logic 34 in order to detect potential conflicts with other aircraft trajectories.

When conflicts are detected, the airborne automation system 20 and the ground-based automation system 22 will follow the predetermined negotiation protocol required by the negotiation process 24 to agree on trajectory modifications to remove the conflict. The negotiation process 24 includes exchange of trajectory information as the aircraft intent data 28 and, as this is a common characteristic to all possible negotiation protocols, it advantageously allows the protocols to be interchangeable.

Once the user-preferred aircraft intent data 28a has been received by air traffic management 12 as shown at 44 in FIG. 3, the negotiation process 24 continues with a look-ahead process at 46. The look-ahead process 46 operates to determine when to launch a conflict detection process 110 and which aircraft (and their trajectories) have to be included in that process. Different look-ahead processes 46 may be implemented as long as pre-established interfaces are maintained.

The look-ahead process 46 may run the conflict detection process 110 periodically. The rate of repetition may be varied, for example according to the volume of air traffic. In addition or as an alternative, the conflict detection process 110 may be invoked whenever a new aircraft enters the managed airspace. Further details are given below.

Once the look-ahead process 46 decides which aircraft 16 are going to be included in the conflict detection process 110, the conflict detection process 110 is launched. Here, as well, different conflict detection processes 110 may be implemented as long as the pre-established interfaces are maintained. In summary, the conflict detection process 110 computes the user-preferred trajectories corresponding to the user-preferred aircraft intent data 28a received, and analyses the trajectories computed to identify potential conflicts.

When any conflicts are identified by the conflict detection process 110, the conflict resolution process 120 is launched.

The conflict resolution process 120 performs calculations to revise the user-preferred aircraft intent data 28a to generate revised aircraft intent data 28b. The revised intents result in corresponding revisions to the user-preferred trajectories in order to remove the identified conflicts. Different conflict detection processes 110 may be implemented as long as the pre-established interfaces are maintained.

As will be explained below, the conflict resolution process 120 calls the conflict detection process 110 to analyze the revised trajectories resulting from the revised aircraft intent data 28b it proposes to ensure that no conflicts remain and that no new conflicts are generated. Once it is confirmed that no conflicts arise, the revised aircraft intent data 28b are transmitted to the affected aircraft 16 by air traffic management 12, as shown at 52 in FIG. 3.

The revised aircraft intent data 28b are received by the aircraft 16 under the current consideration, as shown at 54. The aircraft 16 may generate a corresponding revised trajectory. In some embodiments, the aircraft 16 is obliged to follow the revised trajectory defined by the revised aircraft intent data 28b. In other embodiments, including the embodiment currently being described, the aircraft 16 is given the option of rejecting the revised aircraft intent data 28b. In this case a further round of negotiation is required or, if time does not allow, the aircraft 16 may be commanded to accept the revised trajectory by the ground-based automation system 22. The further round of negotiation may see a new set of revised aircraft intent data 28b sent to the aircraft 16 for review of the corresponding new revised trajectory. If improved aircraft intent data 28b cannot be found, or if computation time for the negotiation process runs out, the ground-based automation system 22 may command the aircraft 16 to follow the original aircraft intent data 28b. In any event, once the revised aircraft intent data 28b is accepted and the corresponding trajectory is executed by the aircraft 16 as shown at 56. As will be appreciated, the conflict detection and resolution process is a dynamic process, and so further changes may be imposed on the trajectory as it is executed by the aircraft 16.

Conflict Detection and Resolution Overview

Methods of detecting and resolving conflicts in predicted aircraft trajectories are now described. These methods ensure that the resolved trajectories do not result in further conflicts downstream, hence avoiding a "domino effect" of conflicting trajectories propagating backwards through the chain of aircraft.

Figure 4:
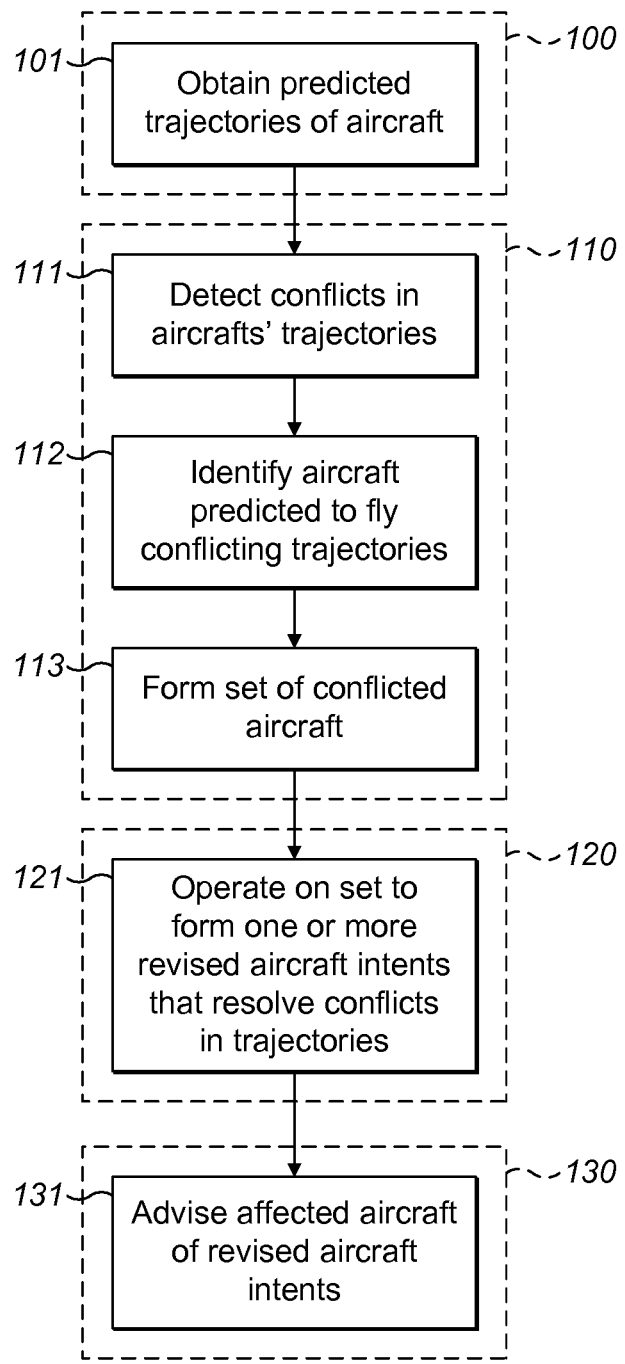
FIG. 4 is a flow chart representation of a method of detecting and resolving conflicts according to an embodiment of the present invention.

The overall conflict detection and resolution process may be envisaged as a two-stage process of firstly detecting conflicts and secondly resolving the conflicts. This is illustrated in FIG. 4 by the dashed boxes 110 and 120. Generally, an initial stage of obtaining user-preferred trajectories of aircraft 16 is performed, as shown by dashed box 100 in FIG. 4. Also, a final stage of advising aircraft 16 of revised aircraft intent data 28b is generally performed, as indicated by dashed box 130 in FIG. 4. A more detailed description of the fuller four-stage method of FIG. 4 will now be provided.

The method of FIG. 4 may be practiced by a ground-based automation system 22 hosted at an air traffic management facility 12, for example using a network of computers located at the facility 12, as described above. Air traffic management 12 will assume responsibility for the safe passage of aircraft through the airspace 10 that it manages. The method starts at 101 where user-preferred trajectories of the aircraft 16 flying through the managed airspace 10 are obtained. This may be done in several different ways. For example, a description of the user-preferred trajectories may be provided. Alternatively, the trajectories may be calculated and hence predicted as part of the method. A description of an aircraft's user-preferred intent data 28a may be provided, for example expressed using a formal language, as shown at 28 in FIG. 2. Air traffic management 12 may then use this user-preferred aircraft intent data 28 to calculate a user-preferred trajectory for the aircraft 16.

With the trajectory prediction process 100 complete, the method moves to the conflict detection process 110. At step 111, aircraft trajectories are compared and conflicts identified. This process is described in more detail below. At 112, the aircraft 16 predicted to fly conflicting trajectories are identified and these aircraft are nominally placed into a set of conflicted aircraft at step 113.

The method then progresses to the conflict resolution process 120. At step 121, the set of aircraft formed at step 113 is used. The user-preferred aircraft intent data 28a of aircraft identified within the set of conflicted aircraft are adjusted and the corresponding trajectories calculated to identify one or more instances where all conflicts are resolved.

Once the conflicts are resolved, the method may progress to process 131 where conflicted aircraft 16 are advised of their revised aircraft intent data 28b. This may involve sending a description of the associated aircraft intent such that the aircraft 16 may then calculate the corresponding trajectory or it may involve transmitting a description of the new trajectory to the aircraft 16. The former example was described above. As a description of aircraft intent is by definition a set of instructions that unambiguously define a trajectory, it is assured that the aircraft 16 will generate the intended trajectory.

As will be appreciated, the above method will be performed repeatedly by air traffic management 12. This accounts for variable conditions that may otherwise affect the calculated trajectories. For example, unexpected winds may give rise to conflicts that were not previously predicted. Repetition of the method may also be used to check that aircraft 16 are indeed following the user-preferred and revised trajectories and that the airspace remains free of predicted conflicts. Although the rate of repetition may be varied, as an example the method may be repeated at set intervals of every thirty seconds. In addition or as an alternative, the method may be invoked whenever a new aircraft 16 enters the managed airspace 10. As well as including all aircraft 16 within the managed airspace 10, the method may also consider aircraft 16 approaching the airspace 10.

Figure 5:
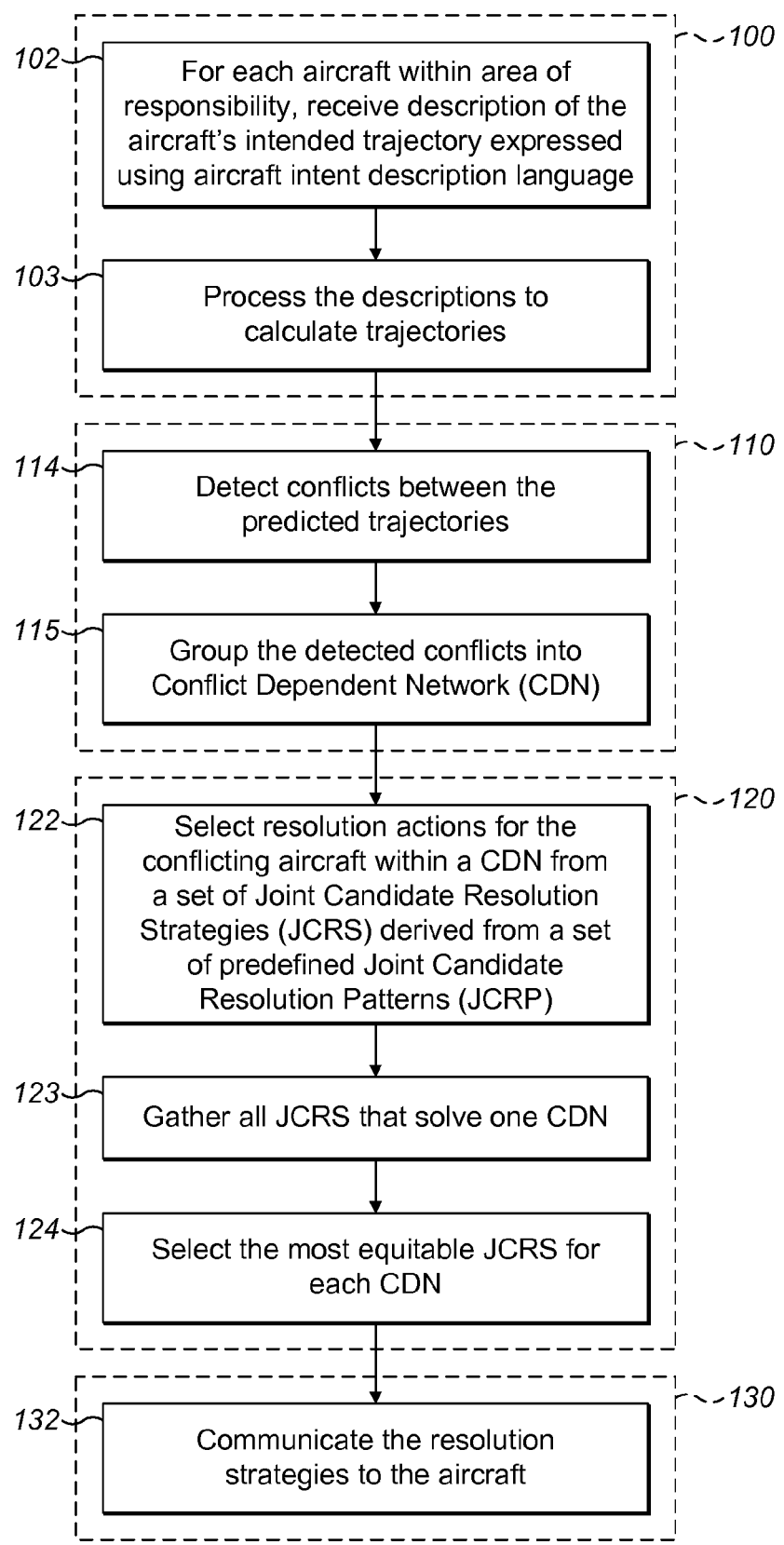
FIG. 5 is a flow chart representation of a method of detecting and resolving conflicts according to another embodiment of the present invention.

FIG. 5 shows another method of managing an airspace 10, including detecting and resolving trajectories of aircraft 16, according to an embodiment of the present invention. According to the embodiment of FIG. 5, the method is integrated in a ground-based automation system 22 and works as follows.

At 102, the traffic management logic 34 of the ground-based automation system 22 receives a description of the user-preferred trajectories of the aircraft within its area of responsibility. The trajectories are described by the user-preferred aircraft intent data 28a expressed using an aircraft intent description language.

At 103, the traffic management logic 34 sends the user-preferred aircraft intent data 28a to the trajectory computation infrastructure 36 that processes those data 28a and predicts the corresponding user-preferred trajectories.

At 114, possible conflicts are identified, i.e. instances where the separation between user-preferred trajectories are in violation of established minimum distances between the aircraft 16.

In this example, at 115, the detected conflicts are grouped into conflict dependent networks. However, conflict dependent networks may or may not be employed with the present disclosure. If conflict dependent networks are not used, all conflicted aircraft may be placed in a single group. Each network includes all aircraft 16 in conflict with at least one other aircraft 16 within the network. For example, if aircraft A1 conflicts with aircraft A2, and aircraft A2 conflicts with aircraft A3 and A4 and aircraft A4 conflicts with aircraft A5, a conflict dependent network is formed containing aircraft A1, A2, A3, A4 and A5. All aircraft 16 within the network have conflict dependencies on the trajectories of all the other aircraft 16 in the network, either directly or indirectly. A consequence of these types of networks is that any particular aircraft 16 can be a member of only one conflict dependent network.

At 120, the conflicts are resolved "network-wise", i.e. considering simultaneously all conflicts in a conflict dependent network. In this way, the implications of the resolution actions on other conflicts within the network are taken into account from the outset. The resolution actions are the actions needed to be taken by an aircraft 16 to avoid the conflict. These actions are designed as amendments to the user-preferred aircraft intent data 28a that produce revised trajectories.

As indicated at 122, the resolution actions for the conflicting aircraft within a conflict dependent network are selected from a set of joint candidate resolution strategies (JCRS). The joint candidate resolution strategies are derived from a set of predefined joint candidate resolution patterns (JCRP). The selection is carried out so that the selected joint candidate resolution strategy belongs to a set of Pareto-optimal joint candidate resolution strategies. This set of joint candidate resolution strategies that solve each conflict dependent network are gathered together at step 123. Pareto optimality in this context may be defined in different ways. For example, it may relate to the changes in flight times or it may relate to a joint cost function capturing the additional operating costs, resulting from the resolution actions as applied across all the aircraft 16 in the conflict dependent network. Thus, the resolution actions in the selected joint candidate resolution strategy are such that the aircraft 16 belonging to the same conflict dependent network share the consequences of the trajectory modifications required to resolve the conflicts. For example, the strategy that sees more, shorter delays spread across more aircraft 16 may be preferred to a strategy that sees fewer, larger delays applied to only a few aircraft 16. At step 124, the optimum joint candidate resolution strategy is selected for each conflict dependent network.

Once the most equitable joint candidate resolution strategy has been selected, the aircraft 16 whose trajectories have been amended are identified and the revised aircraft intent data 28b are communicated to the affected aircraft 16, as indicated at 132.

In this way, it is possible to solve the problem of resolving air traffic conflicts strategically in a trajectory-based operational environment by sharing consequences of changes resulting from the resolution of the conflicts among all aircraft involved.

Figure 6:
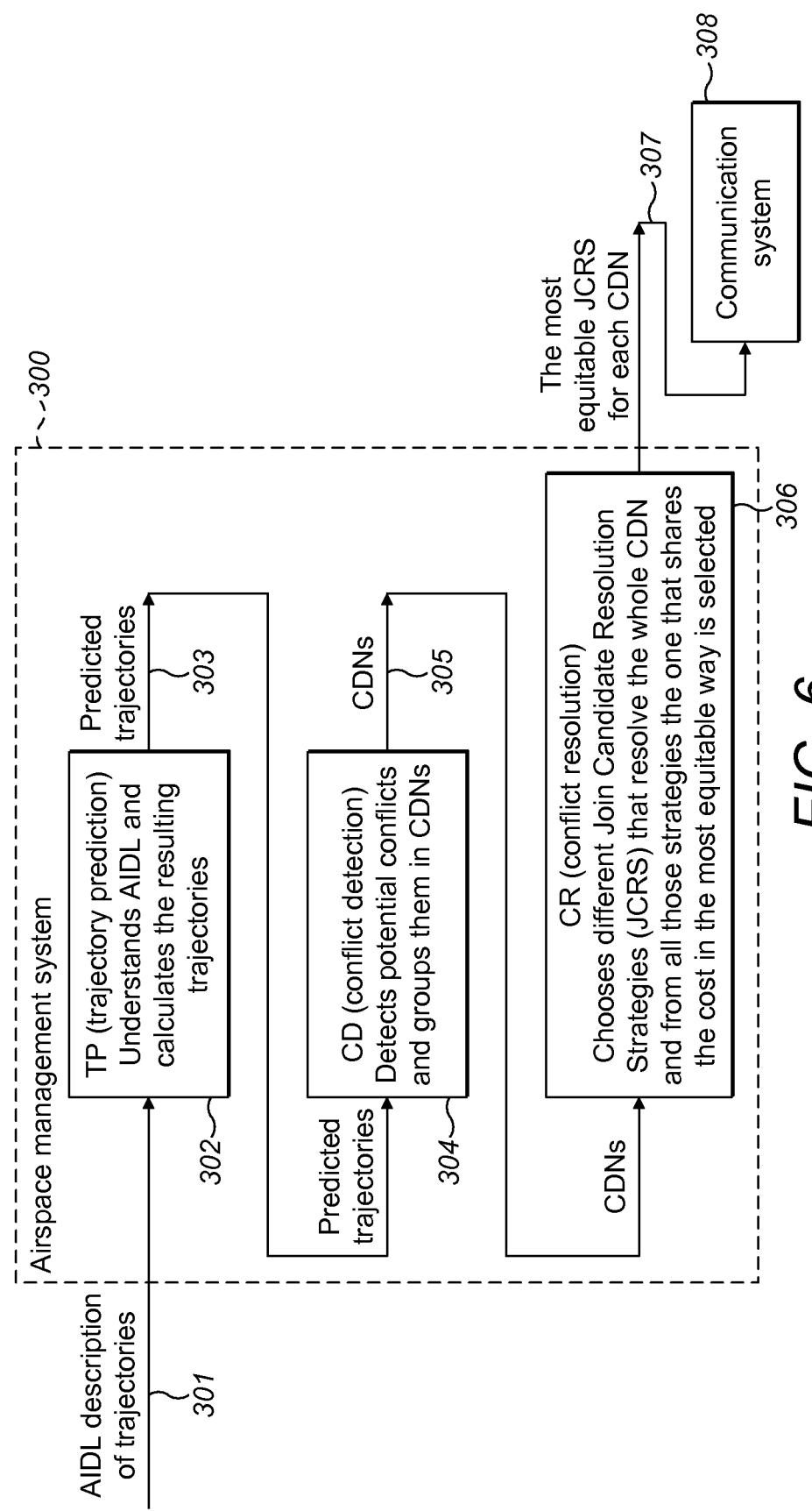
FIG. 6 is a flow chart representation of a system for detecting and resolving conflicts according to an embodiment of the present invention.

FIG. 6 shows a further embodiment of a ground-based automation system 300, that may be used to implement the method of FIG. 4 or FIG. 5. The ground-based automation system 300 comprises three sub-systems, namely a trajectory prediction module 302, a conflict detection module 304 and a conflict resolution module 306.

The ground-based automation system 300 receives as an input a description of the trajectories of the aircraft expressed as user-preferred aircraft intent data 28a using an aircraft intent description language (AIDL), as indicated at 301.

The trajectory prediction module 302 calculates the user-preferred trajectories and provides them as output 303. The user-preferred trajectories 303 are taken as an input by the conflict detection module 304.

The conflict detection module 304 uses the user-preferred trajectories to detect conflicts and to group the conflicts into conflict dependent networks, as has been described above. The conflict detection module 304 provides the conflict dependent networks as an output 305 that is provided to the conflict resolution module 306.

The conflict resolution module 306 operates on the conflict dependent networks to produce joint candidate resolution strategies for each conflict dependent network, and outputs a joint candidate resolution strategy at 307. This joint candidate resolution strategy is used to determine the data to be sent to affected aircraft by a communication system 308. Although the communication system 308 is shown as being separate to the ground-based automation system 300, it may be a part of the ground-based automation system 300. For example, the modules 302, 304 and 306 and, optionally, the communication system 308 may be provided as a computer system. The computer system may comprise a single server, a plurality of servers and may be provided at a single location or as part of a distributed network.

As noted above, the two key processes in the method are the conflict detection process 110 and the conflict resolution process 120. Each of these processes will now be described in more detail.

Conflict Detection

Figure 7:
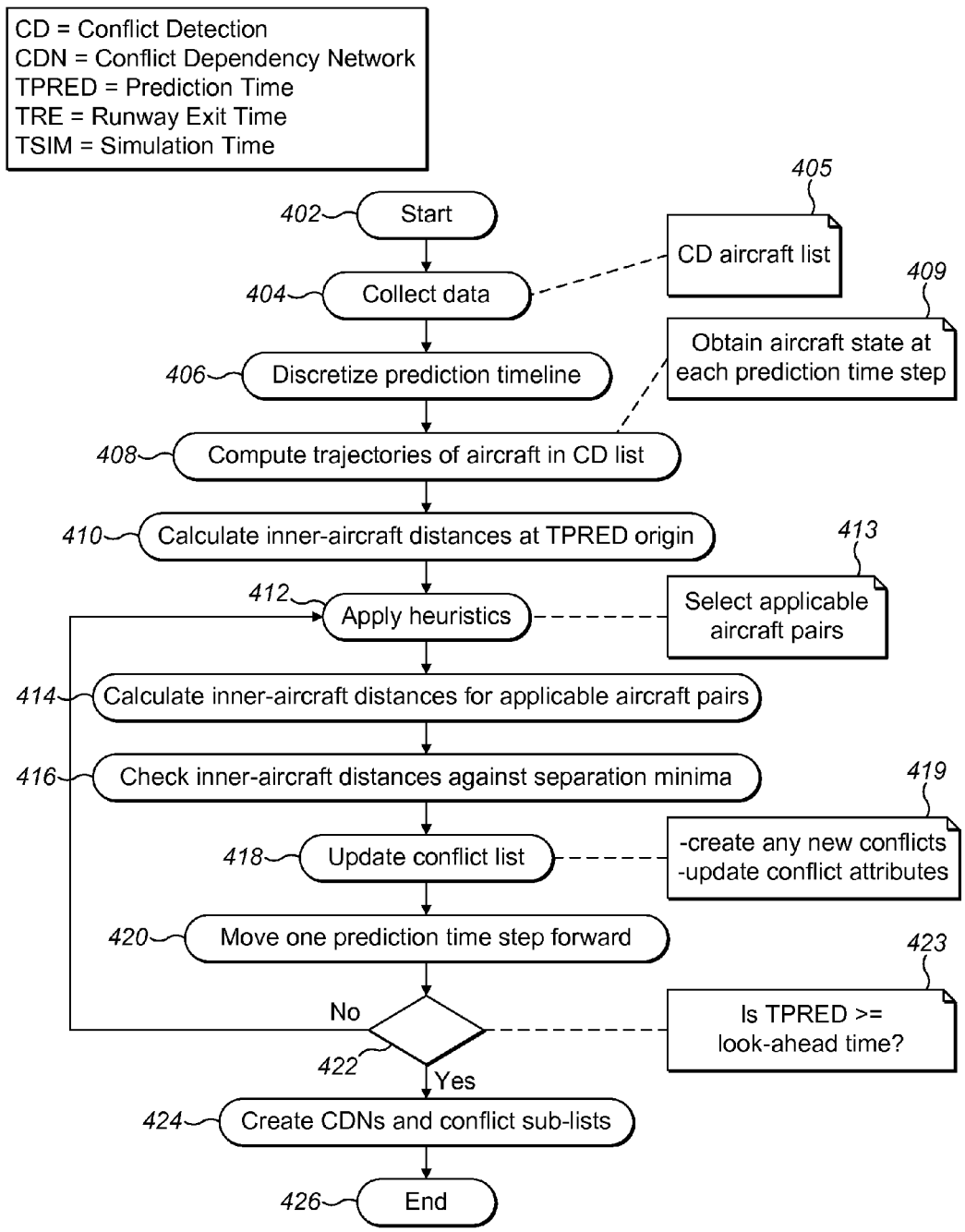
FIG. 7 is a flow chart representation of a conflict detection process.

FIG. 7 shows the steps involved in a preferred form of the conflict detection process 110. FIG. 7 shows the process 110 starting at 402. At step 404, data is collected. Specifically, a conflict detection (CD) list of aircraft 405 is compiled. The aircraft list 405 to be considered by the conflict detection process is the list of aircraft 405 known at the time when the conflict detection and resolution processes are launched.

Each aircraft 16 in the aircraft list 405 must have associated certain pieces of information that are required to carry out the conflict detection process 110. These pieces of information are referred to as conflict detection attributes, and are initially provided together with the aircraft list 405. The conflict resolution process 120 may in turn alter the conflict detection attributes when subsequently calling the conflict detection process 110 in order to verify whether the revised aircraft intent data 28b and the corresponding revised trajectories are indeed conflict free. The main conflict detection attributes are described below.

Type: each aircraft 16 in the list 405 is marked as either available or unavailable, referred to as "unlocked" and "locked" hereinafter. An aircraft 16 has a preferred trajectory that it would like to fly. That trajectory is expressed as the aircraft intent or, in other words, how the aircraft would like to fly that trajectory. If that intention to fly can still be changed, this means the aircraft 16 and air traffic management 12 have not yet agreed to it, in which case the aircraft is available or unlocked. If it cannot be changed, for example because the aircraft 16 has already been subjected to a successful conflict detection and resolution process, the aircraft 16 is unavailable or locked.

Initial conditions: the available aircraft 16 have associated an estimated time and aircraft state at sector entry (i.e. at the time of entering the managed airspace 10). These data represent the predicted initial conditions of the aircraft 16 at sector entry and these conditions are the starting point for the predictions and search for conflicts.

Current aircraft intent: the current aircraft intent of an unlocked aircraft may be that aircraft's user-preferred aircraft intent 28a, or a revised aircraft intent 28b resulting from a previous conflict detection and resolution process.

At 406, the timeline of the current conflict detection and resolution process is discredited.

Next, at 408, the conflict detection process 110 calls a trajectory predictor (TP) of the trajectory computation infrastructure 36 to predict the trajectories within its sector for all the aircraft 16 in the aircraft list 405 from the current simulation time forward. The inputs to the trajectory computation process are the initial conditions and the current aircraft intent 28 provided as the aircraft's conflict detection attributes. This provides the aircraft state at each prediction time step for all aircraft 16, as indicated at 409.

Once the trajectory predictions are available, the conflict detection process 110 starts calculating the evolution of the inter-aircraft distances for all possible aircraft pairs along the prediction timeline. In this embodiment, the term inter-aircraft distance refers to the shortest distance over the Earth's surface between the ground projections of the position of two aircraft 16. Inter-aircraft distance is used because it is assumed that aircraft 16 must maintain horizontal separation at all times and that, consequently, the separation minima applicable are expressed in terms of inter-aircraft distance, e.g. radar separation or wake vortex separation. Thus, a conflict occurs when the predicted inter-aircraft distance between two aircraft 16 falls below the applicable minimum during a certain time interval. The conflict detection process 110 has access to a database containing the applicable minima, which are inter-aircraft distance values that must not be violated. These minima may depend on the aircraft type, and the relative position of the aircraft 16 (e.g. wake vortex separation may prevail between aircraft 16 following the same track, but not between aircraft 16 on converging tracks). During this process, regard may be paid to the vertical separation of aircraft 16, e.g. to allow reduced horizontal separation where the vertical separation is sufficient to allow this.

The conflict detection process 110 starts at step 410 where the inter-aircraft distances are calculated for the initial conditions, i.e. the origin of the timeline. Next, at step 412, all possible pairs of aircraft 16 are formed as shown at 413, and heuristics are applied to each pair of aircraft 16. At each time step, the conflict detection process 110 applies some heuristics before calculating the inter-aircraft distances, in order to skip aircraft pairs that, given the prior evolution of their inter-aircraft distance and their relative positions, cannot possibly enter into a conflict during the current time step. In addition, other heuristics will be in place to accelerate the calculation of the inter-aircraft distances and the comparison with the applicable minima.

Once the heuristics have been applied, the remaining aircraft pairs have their inter-aircraft distances calculated at 414. These inter-aircraft distances are checked against the applicable separation minima at 416. At 418, the list of conflicts is updated with the newly identified conflicts. This step includes creating the new conflicts in the list and updating associated attributes, as shown at 419.

Once step 418 is complete, the conflict detection process 110 can proceed to the next time step, as shown at 420. A check is made at step 422 to ensure that the next time step is not outside the prediction window as indicated at 423 (i.e. the conflict detection process will look forward over a certain time window, and the time steps should move forward to cover the entire window, but should not go beyond the window). Provided another time step is required, the conflict detection process 110 loops back to step 412 where heuristics are applied for the next time step.

In this way, the conflict detection process 110 proceeds along the prediction time line, from the start to the end of the prediction window, calculating the inter-aircraft distance between all possible aircraft pairs at each time step. The conflict detection process 110 is able to identify all conflicts between the aircraft 16 in the aircraft list 405 between the start and end of the prediction timeline. The conflict detection process 110 compiles the identified conflicts into a conflict list, where each conflict is associated with the following pieces of information, denoted as conflict attributes.

Conflicting aircraft pair: identifiers of the two conflicting aircraft 16, together with their conflict detection attributes.

Figure 8A:
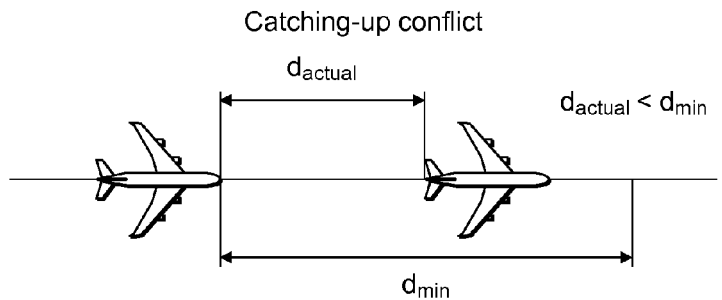
FIGS. 8a and 8b show two examples of conflicting trajectories.
Figure 8B:
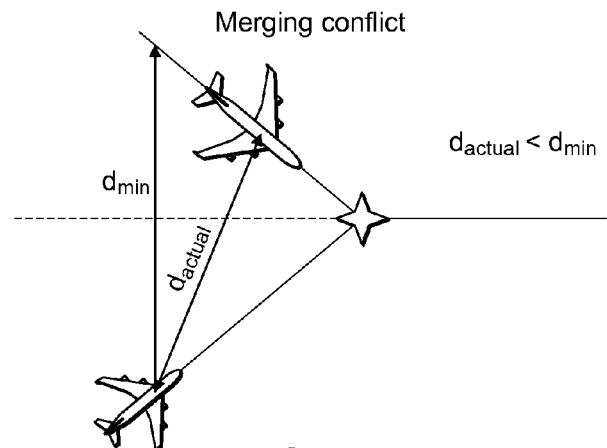

Conflict type: an identifier associated to the type of conflict. In this particular embodiment, only two types of conflicts can occur. The first type, catching-up conflicts, is shown in FIG. 8a where the loss of separation occurs between aircraft 16 flying along the same track, i.e. their separation dactual falls below the minimum separation allowed dmin. The second type, merging conflicts, is shown in FIG. 8b where the loss of separation takes place between two aircraft 16 on converging tracks as they approach the merging point, i.e. their separation dactual falls below the minimum separation allowed dmin.

Conflict interval: the time interval, in the prediction timeline, during which the inter-aircraft distance is below the applicable minimum.

Conflict duration: the length, in time steps, of conflict interval, i.e. the number of times steps during which the inter-aircraft distance is below the applicable minimum.

Conflict intensity: this attribute is a value between 0 and 10 that provides a measure of the severity of the conflict (with 0 being the lowest level of severity and 10 the highest). The conflict intensity is a function of the minimum predicted inter-aircraft distance during the conflict and is calculated taking into account the proportion of the applicable minimum violated by that minimum distance. For example, a minimum predicted separation of 2 miles will result in a conflict intensity of 4.0 when the applicable minimum is 5 miles, and 6.7 when the applicable minimum is 3 miles.

Aircraft intent instructions associated with the conflict: the conflict detection process 110 associates the set of aircraft intent instructions that are active for each of the two conflicting aircraft during the conflict interval.

Subsequently, at 424, the identified conflicts are grouped into conflict dependent networks according to an equivalence relation (called the conflict dependency relation) that is defined over the set of conflicting aircraft 16. This equivalence relation is in turn based on another relation defined over the set of conflicting aircraft 16, namely the conflict relation (IA belongs to the same conflicting pair as B'), which establishes that an aircraft A1 is related to an aircraft A2 if they are in conflict with each other (or they are the same aircraft). The conflict relation is not an equivalence relation, as it does not have the transitive property (if A1 is in conflict with A2 and A2 is in conflict with A3, A1 is not necessarily in conflict with A3). The conflict dependency relation is based on the conflict relation as follows: two aircraft 16 are considered related (equivalent) according to the conflict dependency relation if it is possible to connect them by means of a succession of conflict relations. It is easy to check that this relation fulfils the three properties of equivalence: reflexive, symmetric and transitive.

As an example, let us consider an aircraft A1 anticipated to enter in conflict with two different aircraft, A2 and A3, during a certain segment of its trajectory. In addition, let us assume that A3 will also come in conflict with another aircraft, A4. As a result, the following conflicts (conflict relations) will take place: A1-A2, A1-A3 and A3-A4. From these conflict relations it can immediately be seen that A1 is equivalent to A2 and to A3 and that A3 is equivalent to A4. In addition, by the transitive property A2 is equivalent to A3 (applying the conflict dependency relation: A2 is in conflict with A1, which is in conflict with A3), A1 is equivalent to A4 (applying the conflict dependency relation: A1 is in conflict with A3, which is in conflict with A4) and A2 is equivalent to A4 (applying the conflict dependency relation: A2 is in conflict with A1, which is in conflict with A3, which is in conflict with A4). Thus, the four aircraft 16 belong to the same equivalence class. The elements of an equivalence class are equivalent, under the equivalence relation, to all the others elements of the same equivalence class. Any two different equivalence classes in a non-empty set are disjoint and the union over all of the equivalence classes is the given set.

In the present context, the equivalence classes defined by the conflict dependency equivalence relation are the conflict dependency networks mentioned previously. It will now be understood that the aircraft 16 belonging to each conflict dependent network are interconnected through conflict dependency relations. Considering the properties of equivalence relations, conflict dependent networks are disjoint, i.e. two aircraft 16 cannot belong to two conflict dependent networks simultaneously. In the example above, A1, A2, A3 and A4 form a conflict dependent network.

Considering the above, the conflict detection process 110 first groups the conflicting aircraft 16 into conflict dependent networks at 424 (using the information in the conflict list), and then groups the conflicts between the aircraft 16 in each conflict dependent network into a conflict sub-list. The conflict list contains as many sub-lists as there are conflict dependent networks. Analogously to the conflict dependent networks, conflict sub-lists are disjoint and their union is the conflict list. Finally, the conflict detection process 110 orders the conflicts in each sub-list chronologically (earlier conflicts first) based on the first time step at which the applicable minimum is first violated (the start of the conflict interval). The method then ends at 426.

Conflict Resolution

Completion of the conflict detection process 110 causes the conflict resolution process 120 to be called. The conflict detection process 110 provides the conflict resolution process 120 with the conflict list that, in this embodiment, is further organized into a set of conflict sub-lists that each correspond to a conflict dependent network.

The conflict resolution process 120 modifies the current aircraft intent data 28 of at least some of the conflicting aircraft 16 so that the resulting trajectories are predicted to remain conflict-free and as efficient as possible. The conflict resolution process 120 only alters the aircraft intent data 28 of the unlocked aircraft 16 in the conflict list. Thus, it is assumed that there can be no conflicts involving only locked aircraft (these conflicts would have been resolved in a previous iteration of the conflict detection and resolution processes).

The conflict resolution process 120, for example in the case of arrival management, measures efficiency on the basis of predicted Runway Threshold Crossing Time (tRT) for the aircraft 16. In particular, the objective of the conflict resolution process 120 is to alter the aircraft intent data 28 in such a way that the resulting estimated value of tRT deviates the least possible from the value that would be obtained with the user-preferred aircraft intent data 28a.

The conflict resolution process 120 operates in a network-wise manner, attempting to get the aircraft 16 belonging to the same conflict dependent network to share equally the delays incurred in resolving the conflicts in which they are involved.

Let us assume that the conflict detection aircraft list 405 contains n aircraft grouped into m disjoint conflict dependent networks. Let us now consider the conflict dependency network, $CDN_j = \{A_1^j, \ldots, A_i^j, \ldots, A_{n_j}^j\}$, with $i \in \{1, \ldots, n_j\}$, $j \in \{1, \ldots, m_j\}$ and $$\sum_j n_j = n.$$

All the conflicts in which an aircraft $A_j^i \in CDN_j$ is involved are contained in the conflict sub-list associated to CDNj, denoted as SLj. A Candidate Resolution Strategy (CRS) for an aircraft $A_i^j \in CDN$ is an instance of aircraft intent that, if implemented by $A_i^j$ could potentially result in a conflict-free trajectory for the aircraft 16. In principle, any feasible aircraft intent for $A_i^j$ that is operationally meaningful in the scenario considered could be considered a candidate resolution strategy for that aircraft 16 (including its preferred aircraft intent) since a conflict may be resolved as a result of actions. Candidate resolution strategies are derived from a set of pre-defined candidate resolution patterns (CRPs), which capture the allowable degrees of freedom that the aircraft 16 have at its disposal to resolve conflicts in the scenario considered. Different CRPs target different conflict problems, for example some assist in an aircraft catching up and coming into conflict with an earlier aircraft and some assist in an aircraft falling behind into conflict with a following aircraft. Selection of appropriate CRPs may be made, as is described in more detail below.

A joint candidate resolution strategy (JCRS) for CDNj is a set comprising of nj candidate resolution strategies, each assigned to one of the aircraft in $CDN_j$: $JCRS_j = \{CRS_1^j, \ldots, CRS_i^j, \ldots, CRS_{n_j}^j\}$, with JCRSj denoting a JCRS for CDNj and $CRS_i^j$ denoting a candidate resolution strategy for the aircraft $A_i^j \in CDN_j$. A conflict-free JCRSj is a joint candidate resolution strategy for CDNj that is predicted to result in no conflicts involving the aircraft 16 in CDNj, i.e. SLj would become empty as a result of implementing a conflict-free JCRSj. To check whether a JCRSj is conflict-free, the conflict resolution process 120 must call the conflict detection process 110.

The objective of the conflict resolution process 120 is to design a conflict-free JCRSj that distributes the cost of resolving the conflicts in SLj among the aircraft belonging to CDNj in the most equitable way possible.

It is assumed that the cost incurred by an aircraft $A_i^j$ as a result of implementing a strategy $CRS_i^j$ is measured by the deviation that $CRS_i^j$ causes from the aircraft operator's objectives (for the whole trajectory or a segment). These objectives are captured by the timeline corresponding to the trajectory that results from flying according to the user-preferred aircraft intent and that is denoted as $t_{RT}^{pref}$. Thus, the cost of a candidate resolution strategy $CRS_i^j$ for $A_i^j$ is defined as follows:

$$c(CRS_i^j) = |t_{RT}(CRS_i^j) - t_{RT}^{pref}| \quad (1)$$

where $c(CRS_i^j)$ is the cost of $CRS_i^j$, $t_{RT}(CRS_i^j)$ is the arrival time for aircraft $A_i^j$ that is expected to result from flying $CRS_i^j$.

As it stems from equation (1), the cost of delay and early arrival are considered to be the same. Thus, it is implicitly assumed that it is as costly for the airline to arrive early as to arrive late. The cost function could be adjusted to encode a higher cost of delay versus early arrival. For example, removing the absolute value from $|t_{RT}(CRS_i^j) - t_{RT}^{pref}|$ in (1) would result in early arrivals having a negative cost, which would capture a situation where the airline considers rewarding an early arrival.

Considering the above, the cost of a CRS measures the difference between the arrival time that would result from flying the candidate resolution strategy and those that would result from flying the user-preferred aircraft intent, with the latter being the values preferred by the operator. Thus, the cost of implementing the user-preferred aircraft intent as a CRS is zero, as it would result in no deviation from the preferred arrival time.

In light of the above, the resolution of the conflicts in certain conflict sub-lists is cast as a constrained multi-objective optimization problem over the corresponding conflict dependent network. The problem is stated as follows:

$$\text{minimize } c(JCRS_j) = (c(CRS_1^j), \ldots, c(CRS_i^j), \ldots, c(CRS_{n_j}^j)) \text{ subject to } JCRS_j \in D_j, D \subset X_j \quad (2)$$

where $c(JCRS_j)$ is a vector function, with image in $R^{n_j}$, defined over the set $X_j$, which is the set of all possible joint candidate resolution strategies for $SL_j$. A vector $c(JCRS_j)$ includes the costs derived from each of the candidate resolution strategies contained in $JCRS_j$, a joint candidate resolution strategy for the aircraft 16 in $CDN_j$. $D_j$ denotes the set of conflict-free joint candidate resolution strategies for those aircraft 16. The solution to the problem in (2) would be one (or more) $JCRS_j \in D_j$ that simultaneously minimize, in some appropriate sense, the resolution costs as defined in (1) for all the aircraft 16 in the network.

It is not possible to define a single global optimum for a problem such as the one in (2). Instead, as it is commonly done in multi-objective optimization problems, we will assume that the solution consists of a set of acceptable trade-offs among the costs incurred by the aircraft 16. The set of trade-offs considered is the Pareto set, which comprises of all the Pareto-optimal solutions. A Pareto-optimal solution of (2) is a conflict-free $JCRS_j$ that is optimal in the sense that no other conflict-free $JCRS_j$ can reduce the cost for an aircraft 16 in $CDN_j$ without increasing the cost for at least one other aircraft 16. To characterize mathematically the Pareto set, it is necessary to extend the relational operators $=$, $\leq$ and $<$ to the set $z_j = \text{Im}(c(D_j))$, which is the image of $D_j$ on $R^{n_j}$, i.e. $Z_j \subset R^{n_j}$. Thus, $c(JCRS_j) \in Z_j \subset R^{n_j}$. For any two vectors $u$, $v \in Z_j$, the following relationships are defined:

$$u = v \text{ if } \forall i \in \{1, \ldots, n_j\} : u_i = v_i$$

$$u \leq v \text{ if } \forall i \in \{1, \ldots, n_j\} : u_i \leq v_i$$

$$u < v \text{ if } u \leq v \text{ and } u \neq v \quad (3)$$

Considering the definitions in (3), a conflict-free joint candidate resolution strategy $JCRS^*_j$ is said to be a Pareto-optimal solution to the problem (2) if there is no $JCRS_j \in D$ such that $$c(JCRS_j) < c(JCRS^*_j) \quad (4)$$

The individual candidate resolution strategies that make up a Pareto-optimal solution are denoted as $CRS_1^{j*}, \ldots, CRS_i^{j*}, \ldots, CRS_{n_j}^{j*}$. Considering the individual costs in $c(JCRS^*_j)$, given by $c(JCRS^*_j) = c(JCRS_1^{j*}), \ldots, c_i(JCRS^*_j) = c(JCRS_i^{j*}), \ldots, c_{n_j}(JCRS^*_j) = c(JCRS_{i^{n_j}}^j)$, there is no $JCRS_j \in D_j$ that can cause a reduction in one of these costs without simultaneously causing an increase an at least one of the others. As said above, the Pareto set of the problem (2), denoted as $P_j$, contains all the conflict-free joint candidate resolution strategies for CDN that fulfil equation (4).

The conflict resolution process 120 proposes to resolve the conflicts in SLj by means of a $JCRS^*_j$ selected from the Pareto set, $P_j$. To that aim, the conflict resolution process 120 must first search for Pareto-optimal solutions from which to choose. In other words, the conflict resolution process 120 must build a suitable subset of the Pareto set. Once an appropriate number of conflict-free, Pareto-optimal joint candidate resolution strategies have been found, the conflict resolution process 120 selects the one considered equitable according to axiomatic bargaining principles. Axiomatic bargaining is a field of game theory that provides axioms on how to select solutions with certain properties, such as equity, to a game. In the present context, we can consider the selection of the equitable JCRSj as a game involving the aircraft in CDNj. It is clear that an equitable solution to the game should be Pareto-optimal, $JCRS^*_j$, as a strategy that is not Pareto-optimal will not be unanimously preferred by all players (it will not be equitable to some players). However, Pareto-optimality alone is not sufficient, as some Pareto-optimal solutions may be considered more equitable than others. For example, some Pareto-optimal $JCRS^*_j$ may result in very high costs for some aircraft and very low costs for some other aircraft, while other Pareto-optimal $JCRS^*_j$ may distribute the costs (i.e. time variation) among the aircraft 16 more equitably. Axiomatic bargaining principles will be used to guide the selection of the most equitable $JCRS^*_j$ among those found, with equity in this context reflecting equality in cost distribution.

The selected most-equitable Pareto-optimal strategy is the one proposed to resolve the conflicts in SLj.

The mathematical method adopted to generate Pareto-optimal solutions to (2) is the linear weighting method, which consists of converting the multi-objective optimization problem into a single-objective one where the function to be minimized is a linear combination of the costs $$c(CRS_1^j), \ldots, c(CRS_i^j), \ldots, c\left(CRS_{n_j}^j\right).$$

The resulting single-objective minimization problem is stated as follows: minimize $$w(JCRS_j) = w_1 c_1(JCRS_j) + \ldots + w_i c_i(JCRS_j) + \ldots + w_{n_j} c_{n_j}(JCRS_j) = w_1 c(CRS_1^j) + \ldots + w_i c(CRS_i^j) + \ldots + w_{n_j} c(CRS_{n_j}^j)$$
$$\text{subject to } JCRS_j \in D_j, D \subset X_j \quad (5)$$

The factors wi, with $i \in \{1, \ldots, n_j\}$, are called weights and are assumed to be positive and normalized so that $$\sum_i w_i = 1.$$

Given a combination of values for the weights that comply with the above conditions, the solution of the resulting single-objective minimization problem (5) is a Pareto-optimal solution of the multi-objective minimization problem (2).

The problem of searching for an element of the Pareto set of (2) has been recast as a constrained linear programming problem, which consists of finding the global minimum of a single-objective constrained minimization problem where the objective function is a linear function of the costs associated to the individual candidate resolution strategies in a joint candidate resolution strategy.

The generation of candidate resolution strategies is at the core of the conflict resolution process 120. As mentioned above, the final aim of the conflict resolution process 120 is to find, for each conflicting aircraft 16, a candidate resolution strategy (i.e. an allowable instance of aircraft intent) whose corresponding predicted trajectory is feasible and conflict-free and results in an equitable share of the resolution costs for the operator. It has been seen that the search for an equitable, conflict-free joint candidate resolution strategy for a conflict dependent network is based on minimizing a function of the costs associated to the individual candidate resolution strategies in the joint candidate resolution strategy. Thus, the generation of candidate resolution strategies is at the core of the conflict resolution process 120.

The candidate resolution patterns (CRPs) mentioned above are parameterized instructions used as a template to generate different instructions of the same type. The amended instructions would result in a new trajectory that could resolve the conflicts in which the aircraft 16 is involved. Examples of instructions that will be used to build simple candidate resolution patterns are:

Speed reduction: a sequence of instructions that result in a reduced aircraft speed. A speed reduction may be used to create a delay required to avoid coming into conflict with a preceding aircraft.

Speed increase: a sequence of instructions that result in an increased aircraft speed. A speed increase may be used to gain time required to avoid coming into conflict with a following aircraft.

Altitude change: a sequence of instructions that result in an altitude change.

Figure 9A:
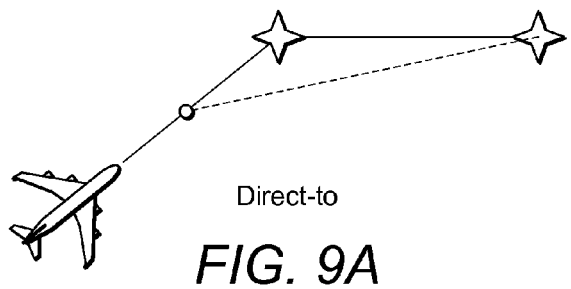
FIGS. 9a and 9b show two examples of how trajectories may be modified to resolve conflicts.

Direct-to: a sequence of lateral instructions that result in a new RNAV horizontal track where the aircraft 16 skips waypoints of the original procedure (it flies direct to a downstream waypoint). A direct-to may be used to gain time or to avoid an area of conflict (see FIG. 9a).

Figure 9B:
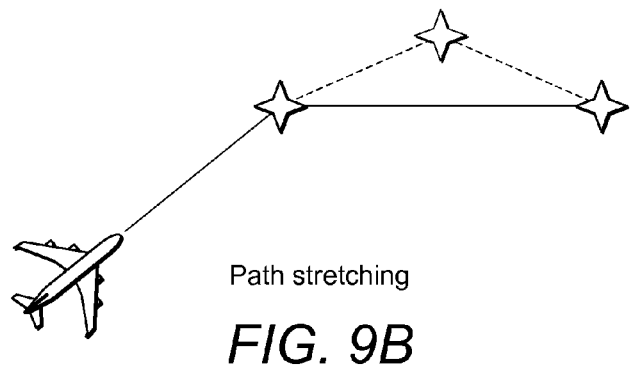

Path stretching: a sequence of lateral instructions that result in a new RNAV horizontal track where waypoints are added to the original procedure. Path stretching may be used to create a delay or to avoid an area of conflict (see FIG. 9b).

When revising aircraft intent data 28 to remove a conflict, the nature of the conflict for the aircraft 16 currently being considered is determined. For example, whether the conflict arises because the current aircraft 16 is catching up with the preceding aircraft 16 may be determined. If so, CRPs that create a delay may be selected. Alternatively, if the conflict arises because the current aircraft 16 is falling behind and coming into conflict with a following aircraft 16, CRPs that give rise to gains in time may be selected. As a further alternative, conflicts arising from paths that cross rather than converge may see CRPs including an altitude change selected.

Once a CRP is selected, random changes to parameters of the aircraft intent 28 may be made, optionally within limits, to generate the candidate resolution strategies. For example, random altitude changes may be used, or random speed changes may be used. The candidate resolution strategies generated in this way for each aircraft 16 may be grouped into joint candidate resolution strategies and the best joint candidate resolution strategies may be selected, as described above.

Figure 10:
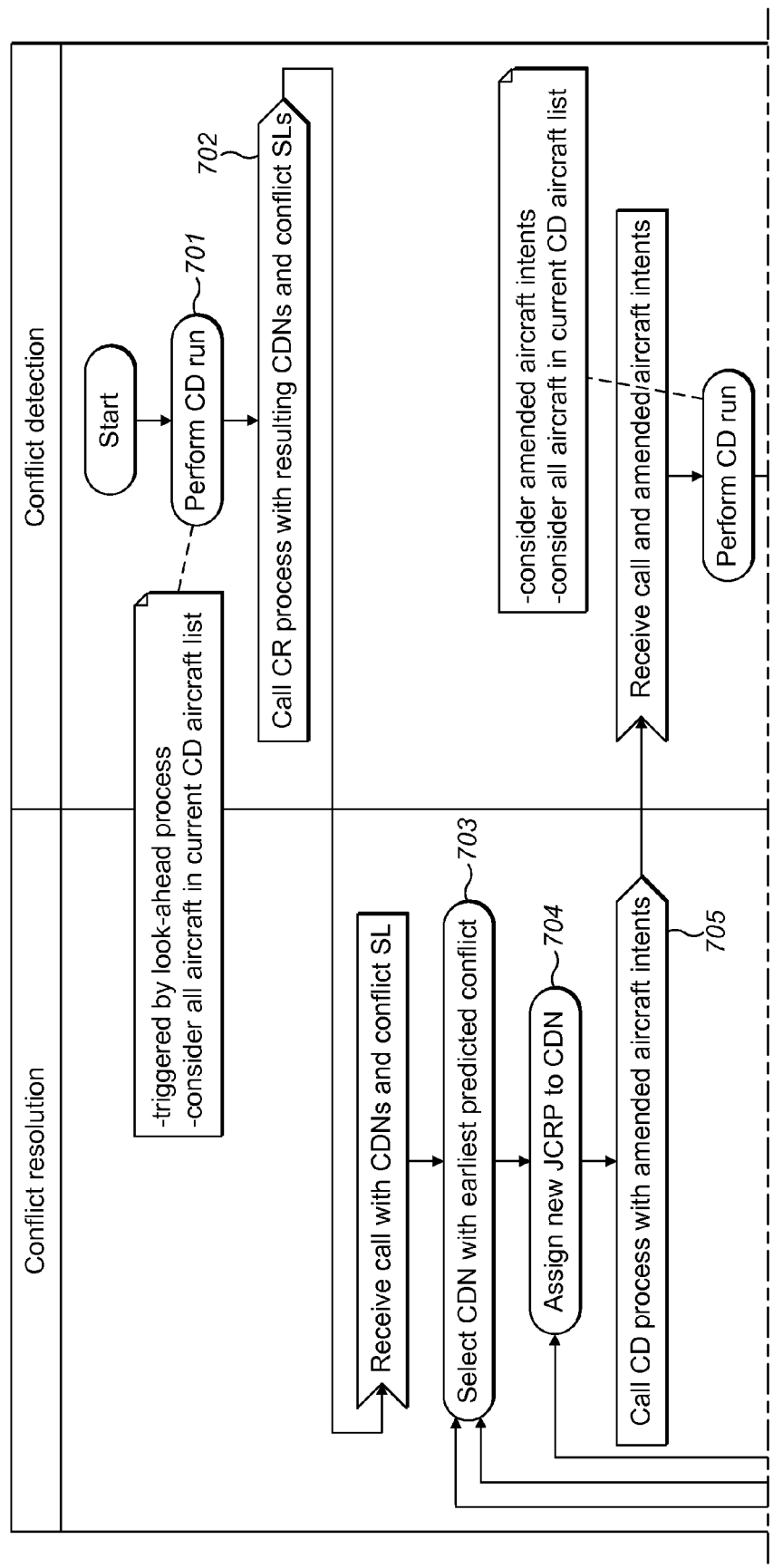
FIG. 10 is a flow chart representation of a conflict resolution process.
Figure 10:
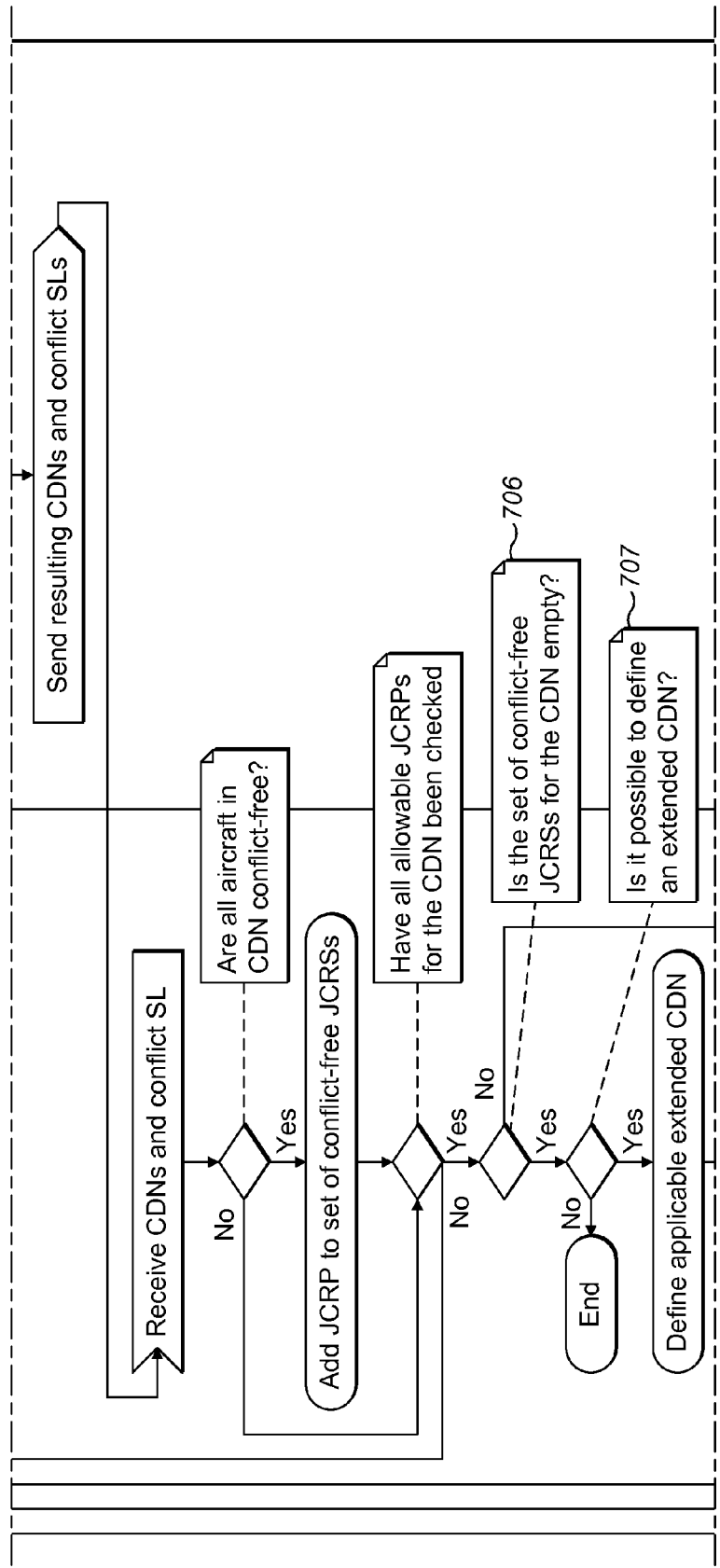
Figure 10:
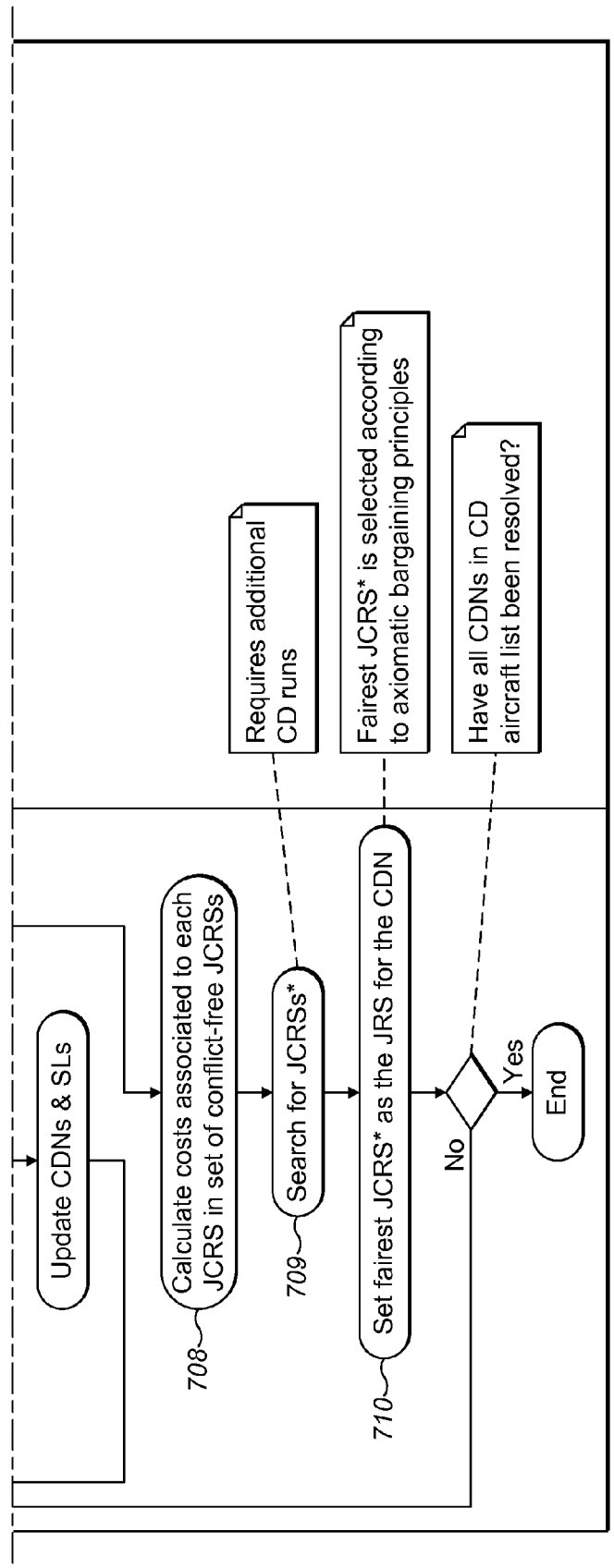

Considering the different concepts introduced above, there follows a brief step-by-step description of a full run of the conflict resolution process 120, which is schematically explained by FIG. 10.

1. When a run of the conflict detection process 110 is completed at 701, the conflict detection process 110 calls the conflict resolution process 120 at 702. The conflict detection process 110 provides the conflict resolution process 120 with the required conflict-related information, namely conflict dependent networks and conflict sub-lists.

2. The conflict resolution process 120 proceeds one conflict dependent network at a time starting at 703, simultaneously considering all the conflicts in a sub-list.

3. For any network CDNj, the resolution of the conflicts in SLj is based on a set of joint candidate resolution patterns (JCRPs) for CDNj. A JCRPj is a JCRSj made up of candidate resolution patterns, $JCRP_j = \{CRP_1^j, \ldots, CRP_i^j, CRP_{n_j}^j\}$. To generate a JCRPj at 704, a candidate resolution pattern must be assigned to each of the aircraft in CDNj. In principle, any allowable candidate resolution pattern for $A_i^j$ could be selected as $CRP_i^j$. The only restriction on the candidate resolution patterns in JCRPj comes from the fact that, when a conflict involves two aircraft with no earlier conflicts in SLj, at least one of the two aircraft must act upon the conflict. Consequently, the candidate resolution pattern assigned to at least one of the two aircraft must include an alternative sequence of instructions that changes the aircraft intent and trajectory prior to the initiation of the conflict interval (the sequence must be triggered before the conflict starts). A series of heuristics will be in place to guide the selection of allowable candidate resolution patterns for $A_i^j$ and the definition of the parameters and trigger conditions of the alternative sequences included in the selected candidate resolution patterns, as described above. These heuristics will be based on the preferred intent of $A_i^j$ and the attributes of the conflicts in which it is involved. For example, the position of the conflict interval along the prediction timeline will help determine the triggers of the alternative instructions and the intensity and duration of the conflicts will help define the values of their parameters.

4. At 705, the conflict detection process 110 is called by the conflict resolution process 120 to check whether the generated JCRPjs are conflict-free. If no conflict-free JCRPjs can be found at 706, heuristic methods are employed at 707 to extend CDNj by including the aircraft 16 interfering with the JCRPjs. Thus, it is implicitly assumed that the reason why the allowable joint conflict resolution patterns do not result in a conflict-free conflict dependent network is because they create conflicts with aircraft 16 outside the network. If an interfering aircraft 16 is itself including in a conflict dependent network, then that conflict dependent network must be considered in combination with CDNj for conflict resolution.

5. The resulting conflict-free JCRPjs are considered as the initial JCRSjs to initiate the search for Pareto-optimal conflict-free $JCRS^*_j$s at 708.

6. A subset of the Pareto set, i.e. set of conflict-free $JCRS^*_j$s built at 709. To generate this subset, the minimization problem in (6) must be repeatedly solved for different sets of values for the weights, so as to obtain Pareto-optimal solutions that cover all areas of the Pareto set. To resolve the minimization problem, a stochastic optimization algorithm is employed. This algorithms will search for the minimum of w(JCRSj) from among JCRSjs generated from the initial joint conflict resolution patterns by randomizing the parameters and trigger conditions of the alternative instructions introduced in the $CRP_i^j$s.

7. Once a set of conflict-free Pareto-optimal solutions $JCRS^*_j$s is available, the most equitable solution among the ones obtained is selected at 710 as the joint resolution strategy for CDNj, denoted as JRSj.

8. Steps 3 to 7 are performed for each of the identified conflict dependent networks. The Joint Resolution Strategy for all the conflicting aircraft is the combination of the JRSjs obtained for the different CDNjs.

Conflict Resolution with Time Constraints

As noted above, it is contemplated that minimal deviation in arrival time, that is the user-preferred time of crossing the runway threshold, will be considered important when resolving conflicts. Embodiments of the present invention will now be described where meeting a user-preferred time constraint is considered during the conflict resolution process 120. The features described below are used in conjunction with the features described above, and hence may be regarded as an extension of the concepts described above. However, this need not be the case. For example, methods of conflict detection 110 other than those described above may be used. In particular, grouping aircraft 16 into conflict dependent networks need not be used. Instead, all aircraft 16 may be considered as a single group, at least initially. Later divisions into groups as described below may then be performed, e.g. into two groups of locked and unlocked aircraft.

In this example, an embodiment of a conflict resolution process 120 operating as part of air traffic management facility 12 in an airspace 10 corresponding to a terminal area is described. User-preferred time constraints are considered as part of the conflict resolution process 120 such that aircraft intent data 28 are generated to produce conflict free trajectories that meet as closely as possible the user-preferred scheduled time of arrivals associated either with waypoints along flight paths towards the runway or associated with crossing the runway threshold.

To ensure safe operation, maintaining safe separation between aircraft 16 is considered a hard constraint that must always be met during the conflict resolution process 120. The scheduling requirement of meeting user-preferred arrival times is treated as a primary objective that has to be met as closely as possible. Secondary objectives like fairness (i.e. as described above, to distribute equitably among all the aircraft 16 the costs incurred in deviating from the user preferred trajectory), operating costs, and environmental impact are also considered. However, these objectives will be sacrificed in preference to the hard constraint of separation and the primary objective of the user-preferred arrival time constraint.

As described above, the aircraft 16 being considered during the conflict resolution process 120 fall into two groups. Specifically, there are locked aircraft 16, and there are unlocked aircraft 16. The aircraft intent data 28 (and hence trajectories) of the unlocked aircraft 16 are free for revision during the conflict resolution process 120, subject to the requirement to trying to meet the user-preferred arrival times. The trajectories of the locked aircraft 16 are already conflict free, and are not available to be modified. Hence, these locked aircraft 16 represent further constraints for the conflict resolution process 120, since separation must be preserved between the unlocked and locked aircraft 16. Which aircraft 16 are locked and unlocked is determined by the process described above, although further grouping into conflict dependent networks is not used in this embodiment.

Although the conflict resolution process 120 is performed at a strategic level, it has been considered that the execution call has a maximum available computation time, tCR;max. This requirement conditions the conflict resolution process 120 so that the secondary objectives are addressed but only to the extent made possible by the available computation time.

Figure 11:
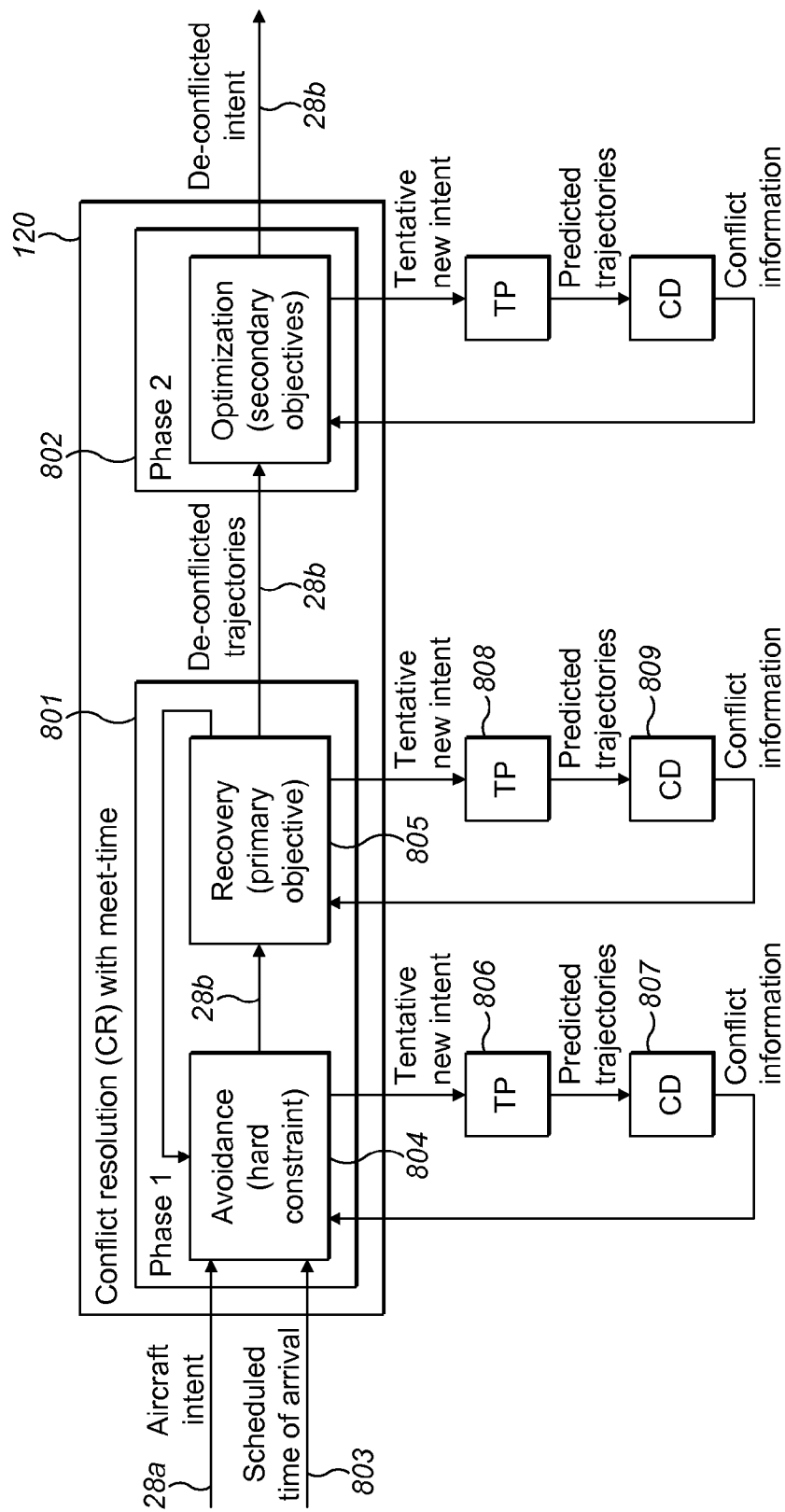
FIG. 11 is a flow chart representation of a method of resolving conflicts with time constraints.

In this embodiment, and as shown in FIG. 11, the conflict resolution process 120 is divided into two phases 801 and 802. The first phase 801 deals with hard constraints and primary objectives (conflict-free, on-time trajectories), whereas the second phase 802 deals with secondary objectives (fairness, cost optimization, etc). The second phase 802 is not performed until the first phase 801 is complete.

The conflict resolution process 120 relies on the trajectory prediction process 100 and the conflict detection process 110 described above. As before, every time a set of new revised aircraft intent data 28b is proposed, it is determined whether the revised aircraft intent data 28b gives rise to any conflicts.

As shown in FIG. 11, the inputs to the conflict resolution process 120 are aircraft intent data 28 relating to a set of n unlocked aircraft 16. For each unlocked aircraft 16, aircraft intent data 28 (either user-preferred aircraft intent data 28a or revised aircraft intent data 28b) and the user preferred arrival time(s) 803 are received. In addition, the conflict resolution process 120 also receives as an input aircraft intent data 28 (either user-preferred aircraft intent data 28a or revised aircraft intent data 28b) for each of m locked aircraft 16. These data represent constraints for the conflict resolution process 120.

In addition, the conflict resolution process 120 may also receive or be able to request data describing the terminal area constraints. For example, these data may describe the terminal area boundary, any restricted areas, and any speed constraints. These data may then be taken into account during the conflict resolution process 120.

The objective of the first phase 801 is to generate revised aircraft intent data 28b of unlocked aircraft 16 corresponding to revised trajectories that are conflict-free to meet the hard constraint and that also meet the primary objective of the scheduling requirements to meet user preferred arrival times. To achieve this, two steps are carried out for each unlocked aircraft 16, namely avoidance 804 and recovery 805 as shown in FIG. 11.

The set of unlocked aircraft 16 is ordered according to their user preferred arrival times, earliest first. Each unlocked aircraft 16 from this set is considered in turn with the avoidance 804 and recovery 805 steps being performed on each unlocked aircraft 16 before moving on to the next unlocked aircraft 16.

In the avoidance step 804, two requirements are imposed. The trajectories must be conflict free and they have to meet a sequencing requirement as the user preferred arrival times by their nature define an arrival sequence. The latter requirement is imposed as a new constraint relative to the embodiments described above. An unlocked aircraft 16 may already be conflict free, and may also have aircraft intent data 28 that will meet the user preferred arrival time, in which case no revision of the aircraft intent data 28b is necessary. As will be explained in greater detail below, revisions of the aircraft intent data 28 have a random element such that optimisation of the arrival time is not considered a part of the avoidance step 804: rather, the removal of conflicts is the main consideration.

In the avoidance step 804, where revision of the aircraft intent data 28 is necessary, the resulting revised arrival time of a given aircraft 16 must be later than the arrival time of the preceding sequenced aircraft 16, whether that aircraft 16 be locked or unlocked. Any proposals for revised aircraft intent data 28b are checked to ensure they do not give rise to conflicts. Hence, proposals of revised aircraft intent data 28b are sent to a trajectory predictor as shown at 806, where the corresponding revised trajectories are calculated and a check for conflicts is made at 807. As the revisions include a random element, conflicts may arise. If they are found, a new proposal for the revised aircraft intent data 28b is calculated and again checked for conflicts. This is repeated until conflict-free aircraft intent data 28 is provided for the unlocked aircraft 16 under consideration.

Thus, the output of this avoidance step 804 is a set of aircraft intent data 28, that may or may not have been revised, and that describes a conflict-free trajectory that complies with the pre-determined arrival sequence. These data are provided to the recovery step 805.

In the recovery step 805, the aircraft intent data 28 are checked to see whether they meet the user preferred arrival time. If not, the aircraft intent data 28 are revised in order to have a revised arrival time as close as possible to the user preferred arrival time. This is achieved by proposing new revised aircraft intent data 28b. This step includes calculating the corresponding revised trajectories with a trajectory predictor as shown at 808, and then checking for conflicts at 809.

Hence, the output of this recovery step 806 is aircraft intent data 28 corresponding to a conflict-free trajectory with an estimated arrival time either meeting or very close to the user preferred arrival time.

The avoidance 804 and recovery 805 steps are repeated for each unlocked aircraft 16 in turn, and ultimately produces a set of conflict-free aircraft intent data 28 with trajectories that all meet or are close the user preferred arrival times.

As avoidance and recovery steps 804 and 805 are applied sequentially to the unlocked aircraft 16 according to their arrival sequence, this allows smaller numbers of aircraft 16 to be considered at each stage, thereby reducing computational requirements. While a particular unlocked aircraft i is processed (as is described in more detail below), the only conflicts considered are those with the locked aircraft 16 and the i−1 unlocked aircraft 16 previously processed. That is, conflicts with later arriving, unlocked aircraft 16 are not considered as it is assumed that these will be resolved when that later unlocked aircraft 16 is processed. For example, when the first unlocked aircraft 16 is processed, only conflicts with locked aircraft 16 are considered. When the second aircraft 16 is processed, conflicts with the locked aircraft 16 and the first unlocked aircraft 16 are considered. So, in essence, the complete set of aircraft 16 is built up, aircraft by aircraft, into a set of conflict-free aircraft 16.

When aircraft i is processed, the available computation time t$_{available}$ for both the avoidance and recovery steps 804 and 805 is given by:

$$t_{available} = \frac{(t_{CR;max} - t)}{(n + 1 - i)}$$

where t is the time consumed so far by the conflict resolution process. All available computation time is shared out in this first phase 801. If the time spent in the avoidance and recovery steps 804 and 805 for any particular aircraft 16 is lower than t$_{available}$, then the time available for each of the remaining aircraft 16 is greater. If after the first phase 801 there is still available computation time, this is used to implement the second phase 802.

Figure 12:
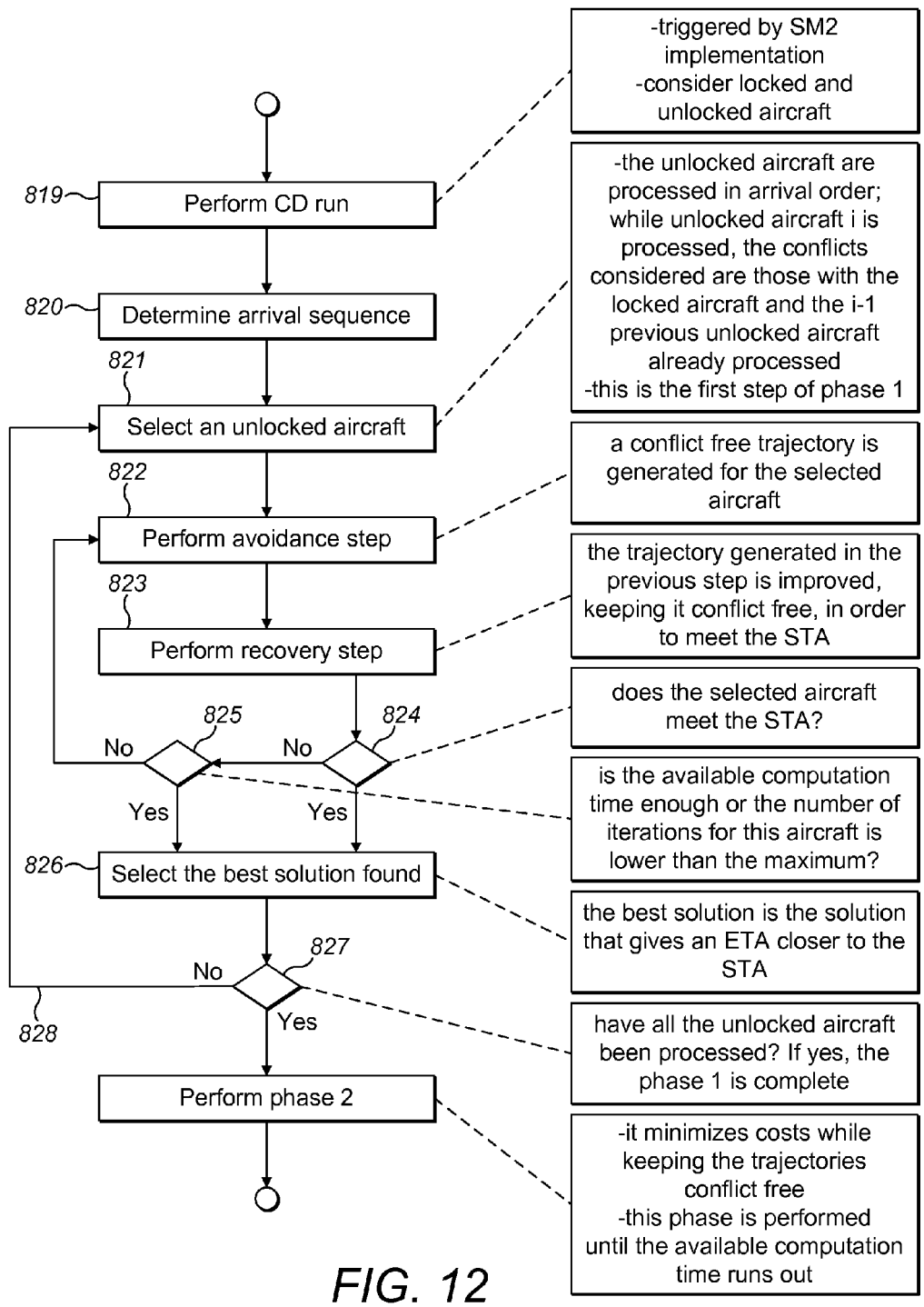
FIG. 12 is a flow chart representation of the method of conflict resolution of FIG. 11.

A sequence diagram of this conflict resolution process 130 is shown in FIG. 12. At 819, the method begins with a conflict detection process to ensure that there are conflicts present that require a conflict resolution process 120 to run.

Assuming conflicts are present, at 820 the method continues by determining the arrival sequence, i.e. sorting the locked and unlocked aircraft 16 in a master list of aircraft 16 according to their user preferred arrival times (i.e. scheduled arrival times). The unlocked aircraft 16 are extracted and placed in an ordered sub-list with aircraft having the earliest arrival time first so that they are ready to be processed sequentially as described above. These unlocked aircraft 16 are considered in turn, with the earliest user preferred times of arrival being considered first, and with conflicts with only preceding aircraft being considered. The associated step of selecting an aircraft 16 from the sub-list is shown at 821 of FIG. 12.

For each aircraft i in the sub-list, the avoidance and recovery steps 804 and 805 are performed as follows.

The avoidance step 804 is performed at 822 and consists of generating revised aircraft intent data 28b that results in a trajectory that satisfies the constraints given in the equations below. The avoidance step 804 is shown in more detail in FIG. 13.

Briefly, the avoidance step 804 includes an initial check is made to see if the given constraints are met by the user preferred trajectory corresponding to the user preferred aircraft intent data 28a provided by the aircraft 16. If it is not the case, a random search is performed to obtain a first valid solution corresponding to revised aircraft intent data 28b and a corresponding revised trajectory, as shown at 850.

The "random" search may be guided, for example by determining an appropriate candidate resolution strategy or an appropriate set of candidate resolution strategies as described above. In this case, randomness is introduced by randomly selecting a particular strategy or by selecting how much the aircraft intent is changed. For example, if the conflict arises because the unlocked aircraft 16 is catching up with the preceding aircraft 16, a candidate resolution strategy may be randomly picked from the strategies that provide a time delay. Say this lead to a speed decrease strategy being selected: then, a decrease in speed of a random amount may be commanded.

Further constraints may be placed on the randomness of the revision of the aircraft intent data 28. If the vector xi describing the revised aircraft intent data 28b contains the intent parameters that define the trajectory of aircraft i, then this step is constrained to generate randomly a vector $x_i$ that satisfies the following constraints (case i>1).

$$|\Delta r|_i < |\Delta r|_{max,i} \tag{7}$$

$$d_{i,1} \geq d_s, \ldots, d_{i,j-1} \geq d_s \tag{8}$$

$$\hat{d}_{i,1} \geq d_s, \ldots, \hat{d}_{i,j-1} \geq d_s \tag{9}$$

$$t_{ETA,i} > t_{STA,i-1} \tag{10}$$

where $|\Delta r|_i$ the difference in path length between user preferred trajectory and the revised trajectory for aircraft i, $|\Delta r|_{max,i}$ is the maximum difference in path length allowed between user preferred and revised trajectories for aircraft i (a predefined parameter that may be set as required), $d_{i,j}$ is the minimum separation between the trajectories of unlocked aircraft i and unlocked aircraft j (i.e. calculated for each of the previously-considered unlocked aircraft i−1, i−2, etc.), $d_s$ is the separation minimum allowed between any pair of aircraft 16, $\hat{d}_{i,j}$ is the minimum separation between the trajectories of unlocked aircraft i and locked aircraft j (i.e. calculated for each of the locked aircraft), $t_{ETA,i}$ is the revised time of arrival (i.e. estimated time of arrival) of the unlocked aircraft i according to the revised trajectory, and $t_{STA,i-1}$ is the user preferred time of arrival (i.e. scheduled time of arrival) of the preceding aircraft.

Equation (7) above provides a constraint that there is a limit in the distance that the trajectory can be shortened (clearly, the trajectory cannot be shortened indefinitely, since the aircraft 16 must descend and land flying according to its own operational procedures) and a limit to how much the trajectory can be lengthened. Equation (10) above provides a sequencing constraint, namely that the revised arrival time of aircraft i must be later than the user preferred arrival time of the preceding aircraft (i−1), i.e. that the current aircraft cannot "overtake" the preceding aircraft.

Equation (8) above provides a constraint that avoids conflicts between aircraft i and the (i−1) preceding and previously-considered unlocked aircraft 16. Equation (9) above provides a constraint that avoids conflicts between aircraft i and the m locked aircraft 16. Equations (8) and (9) together effectively correspond to the conflict detection step 807 shown in FIG. 11, i.e. ensuring separations are maintained when revising the aircraft intent data 28 ensures conflicts will not arise.

For the special case of the first unlocked aircraft 16 to be considered, i.e. where i=1, the following reduced set of constraints apply.

$$|\Delta r|_i < |\Delta r|_{max,i} \quad (7a)$$

$$\hat{d}_{1,1} \geq d_s, \ldots, \hat{d}_{1,m} \geq d_s \quad (9a)$$

$$t_{ETA,1} \geq \hat{t}_{STA} \quad (10a)$$

where the revised arrival time $t_{ETA}$ has to be greater than the user preferred arrival time $\hat{t}_{ETA}$ of the locked aircraft 16 that arrives just before. If there are no locked aircraft due to arrive before the current aircraft 16 under consideration, this constraint is replaced by $t_{ETA,1} > t_{STA,1} - 100$. That is, the revised time of arrival $t_{ETA,1}$ is limited to be no more than 100 seconds before the user preferred time of arrival $t_{STA,1}$. The offset of 100 seconds may be varied as desired.

Figure 13:
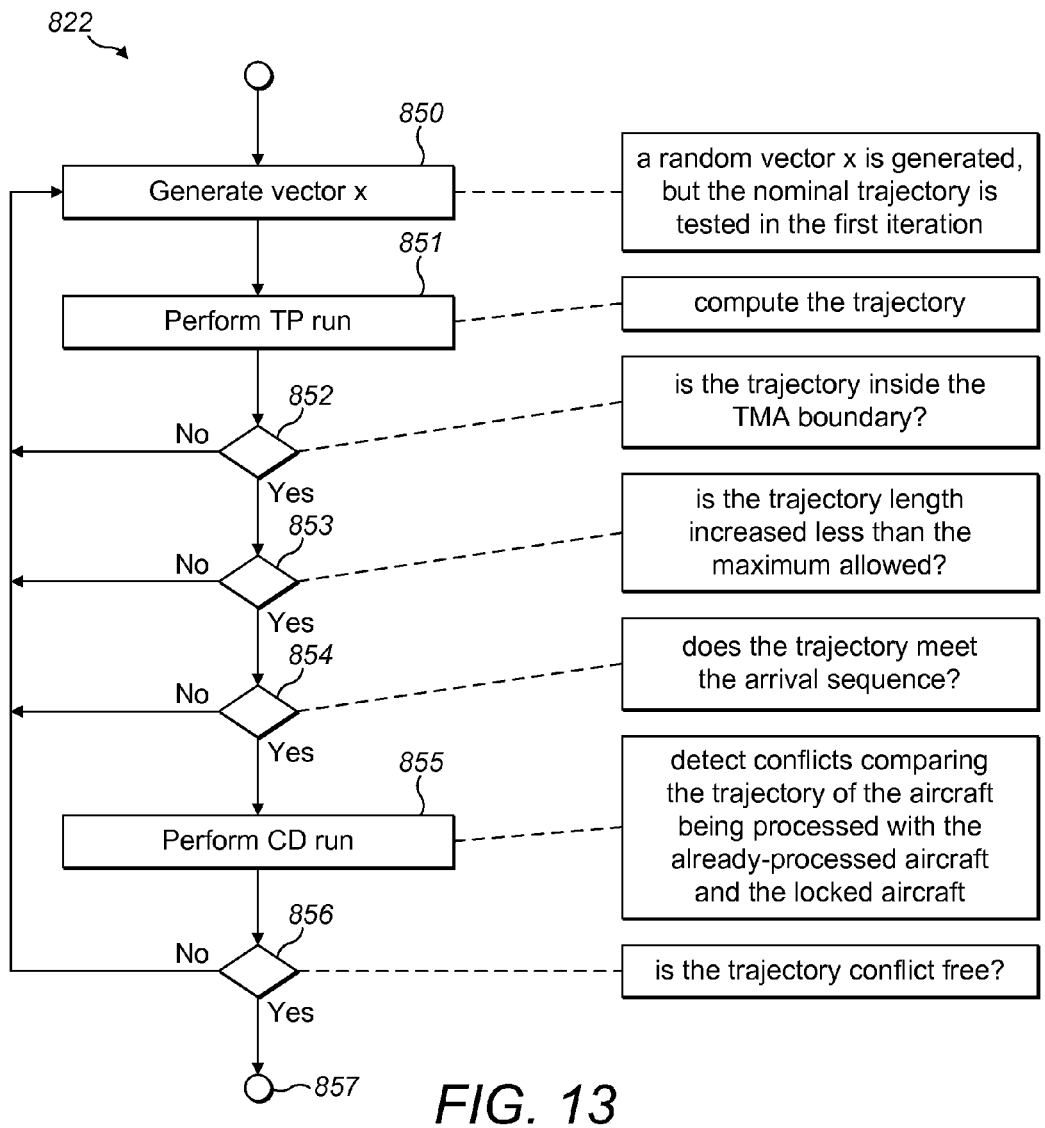
FIG. 13 is a flow chart representation of generating a new aircraft intent for use with the method of conflict resolution of FIG. 11.

By way of further explanation, and with reference to FIG. 13, the avoidance step 804 is performed as follows.

At 850, the aircraft intent data 28 corresponding to the user preferred trajectory x0i is used as the vector xi. At 851, the trajectory predictor is called to calculate the user preferred trajectory. At 852 a check is made to ensure that the user preferred trajectory remains within the boundaries of the terminal area. If not, the method returns to step 850.

Assuming step 852 is passed, then steps 853 to 854 are skipped for the first iteration as it is the user-preferred trajectory that is under consideration. At step 855, a conflict detection process 110 is performed at 856 to determine whether the user preferred trajectory gives rise to a conflict. If the user preferred trajectory of the current unlocked aircraft 16 is conflict free, the avoidance step terminates at 857. If a conflict is detected at step 856, the method returns to step 850.

At step 850 in the second and all subsequent iterations, the method performs a random search for revised aircraft intent data 28b that produces a corresponding revised trajectory that is based on a normal distribution, as described above. A new vector xi is generated around the vector x0i that represents the user preferred trajectory for aircraft i.

Methods of generating revised aircraft intent 28b have been described above and these methods are used to generate the new vector xi. In summary, the type of conflict such as catching up or falling behind is identified and an appropriate strategy is selected at random from a constrained set of appropriate candidate resolution strategies, for example by increasing speed or adding waypoints. The actual value is also randomly generated, e.g. a speed increase command may be used where the value of the increase is randomly generated. At this time, there is no attempt to meet the user preferred arrival time.

As before, at step 851 the revised trajectory is calculated for the revised aircraft intent data 28b that may also include a revised time of arrival tETA,i. At step 852, a check is made to ensure the revised trajectory remains within the terminal area boundaries.

At step 853, a check is made relating to equation (7) above, namely to ensure that the change in path length is within the limit set. If not, the method returns to step 850 where a new random vector xi is generated. If passed, at step 854 a further check is made, this time relating to equation (10) above. In this check, the arrival sequence is checked to make sure that the revised trajectory does not result in the aircraft 16 arriving before the previous aircraft 16 is due to land. If step 854 is failed, the method returns to step 850 where a new random vector xi is generated. If step 854 is passed, the method continues to 855 where a conflict detection process 110 is run to ensure the equations (8) and (9) above are met, i.e. that there are no conflicts with any of the previously considered unlocked aircraft 16 and any of the locked aircraft 16. If conflicts are found, the method returns to step 850 where a new random vector xi is generated, else the method terminates at 857.

Returning to FIG. 12 and our consideration of the ith aircraft, the method continues from the avoidance step 804 to the recovery step 805 as indicated in FIG. 12 at 823.

In the recovery step 805, the revised trajectory found in the avoidance step 804 is now improved in order for the revised time of arrival tETA,i to meet better the user preferred time of arrival tSTA,i. The recovery step 805 may be omitted where the user preferred trajectory (resulting from the user preferred aircraft intent data 28a) was found not to give rise to a conflict at step 822. In the recovery step 805, an optimization problem is formulated, namely to minimize the deviation of the revised time of arrival tETA,i from the user preferred time of arrival tSTA,i whilst keeping the trajectory conflict free. That is the following function is minimized, while preserving equations (7) to (10) provided above:

$$f = (t_{ETA,i} - t_{STA,i})^2 \quad (11)$$

Preserving equations (8) and (9) ensures that the new revised aircraft intent data 28b has a corresponding revised trajectory that remains conflict free.

As will be appreciated, this minimization sees deviations in arrival time penalized that are both earlier and later. One suitable method that may be used to solve this optimization problem is MATLAB's fmincon function. This function finds the minimum of a constrained non-linear multivariable function. It attempts to find a constrained minimum of a scalar function of several variables starting with an initial estimate. This is generally referred to as a constrained non-linear optimisation or non-linear programming. The function is based on the BFGS (Broyden-Fletcher-Goldfarb-Shanno) method, a well-known method of solving non-linear optimisation problems.

At step 824, the revised time of arrival tETA,i is checked to see whether it meets the user preferred time of arrival tSTA,i. If, after this improvement, the user preferred time of arrival tSTA,i cannot be met, a further test is made at step 825 to determine whether a further iteration of the avoidance step 804 should be performed. This is determined according to the remaining available computation time and whether a maximum number of iterations through steps 822 to 824 have been performed.

If a further iteration is available, avoidance step 822 is repeated. This ensures that a new starting random trajectory xi is generated that can act as a new starting point for the optimisation recovery process 805 that will hopefully allow the user preferred time of arrival to be met.

Eventually, the method will proceed to step 826 where the aircraft intent data 28b corresponding to the best solution found by the one or more iterations of the avoidance and recovery steps 804 and 805 is selected. The best solution will be the one having met the user preferred time of arrival or the one that shows the smallest deviation from the user preferred time of arrival.

Steps 821 to 826 described above are repeated for each of the unlocked aircraft 16 in the sub-list in order. A test is performed at step 827 to determine if the current aircraft 16 is the last unlocked aircraft 16 in the sub-list. If it is not, the method repeats as indicated by the return loop 828 in FIG. 12 such that the next unlocked aircraft 16 may be processed.

If it is the last aircraft 16 such that all unlocked aircraft 16 are processed, the first phase 801 of avoidance 804 and recovery 805 is complete. With the first phase 801 complete, all trajectories are conflict-free with revised times of arrival tETA,i the same as or very close to the user preferred times of arrival tSTA,i. However, the revised trajectories may not meet the secondary objectives. For example, the revised trajectories may have a high cost, perhaps due to a high deviation from the user preferred trajectories. Thus, an optimization phase is required, namely the second phase 802.

In the second phase 802, the aim is to minimize a combination of costs considering the secondary objectives. In the second phase 802 of this embodiment, only the deviation from the trajectory corresponding to the user preferred aircraft intent data 28a is considered. As noted above, other costs may be considered such as how fairly or equitably amendments to aircraft intent data are shared between aircraft 16.

Figure 14:
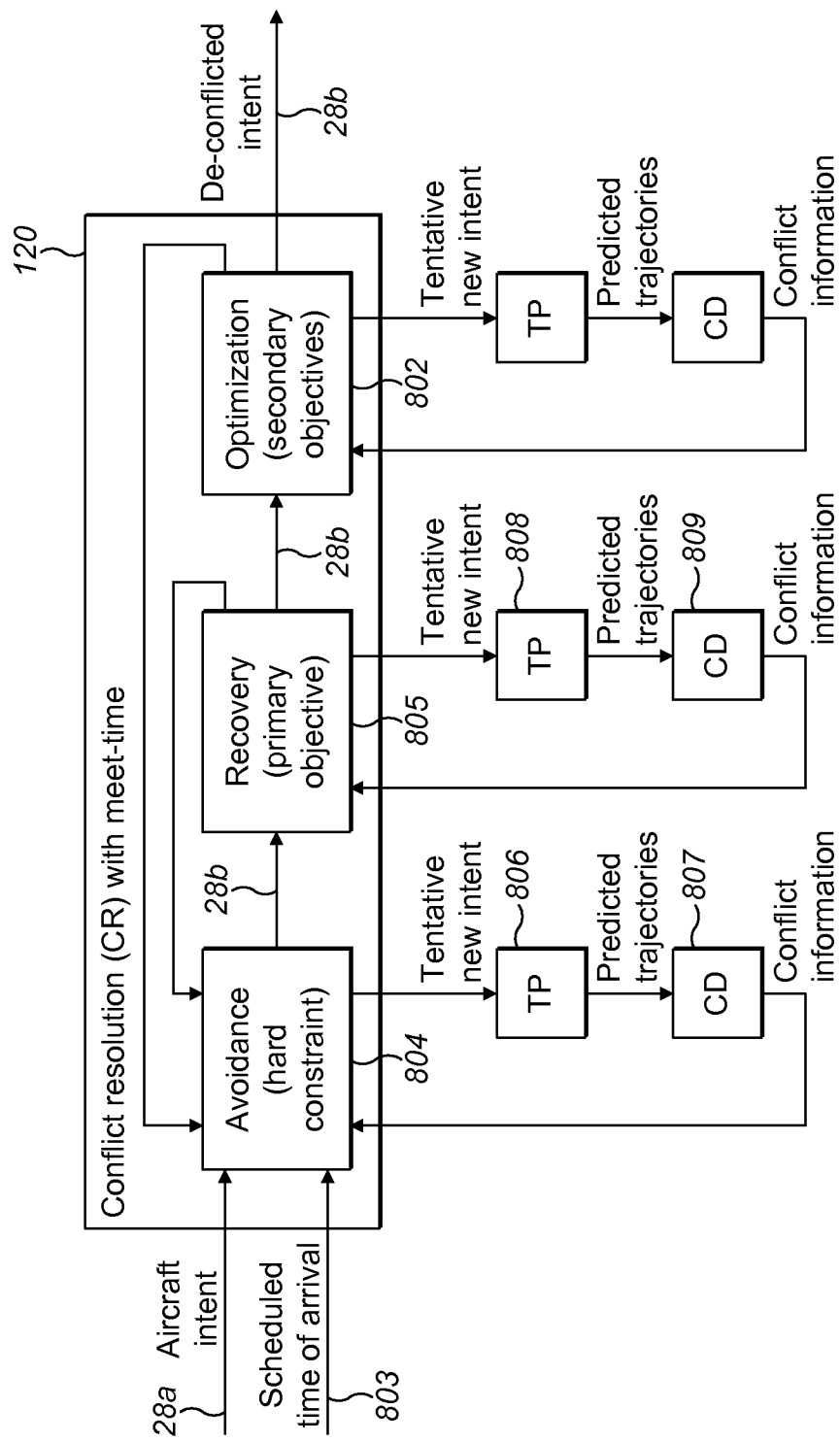
FIG. 14 is a flow chart representation of an alternative method of resolving conflicts with time constraints.

Starting from the trajectories provided by the first phase 801, a global optimization is performed. The modification of all the aircraft intent data 28 at once implies a high computational cost, and so attention may need to be paid to the run time. An alternative embodiment is shown in FIG. 14 and described below that reduces the computational cost. The global optimization is performed until the available computation time elapses.

The following optimization problem is solved. A minimisation of the following function is performed, $$f = \frac{1}{n}\sqrt{(x-x^0)^T(x-x^0)} \quad (12)$$

subject to $$|\Delta r|_i < |\Delta r|_{max,i} \quad (13)$$

$$d_{i,1} \geq d_s \quad (14)$$

$$\hat{d}_{i,1} \geq d_s, \ldots, \hat{d}_{i,m} \geq d_s \quad (15)$$

$$t_{ETA,i} = t_{ETA,i}^1 \quad (16)$$

$$\forall i,j=1,\ldots,n; j \neq i \quad (17)$$

with notation as described above, and where $x=[x_1^T \ldots x_n^T]^T$, $x^0$ is the value of the parameters in the nominal case, and $t^1_{ETA,i}$ is the revised time of arrival of aircraft i that was obtained in the first phase 801. Equations (14) and (15) ensure separations are maintained and hence that no conflicts arise. The last constraint shown in equation (16) ensures that the arrival time obtained in the first phase 801 is maintained. The method used to solve the optimization problem is MATLAB's fmincon that was described above.

FIG. 14 shows an alternative method of resolving conflicts with time constraints that reduces computational requirements by avoiding a global optimisation at the optimisation stage 802.

The method of FIG. 14 is largely the same as for FIG. 11, with the key difference being that the method is not split into two phases. Instead, each unlocked aircraft 16 is processed sequentially with three steps of avoidance 804, recovery 805 and optimisation 802. As the optimisation 802 is performed on each unlocked aircraft 16 in turn, it becomes a local optimisation rather than a global optimisation.

Figure 15:
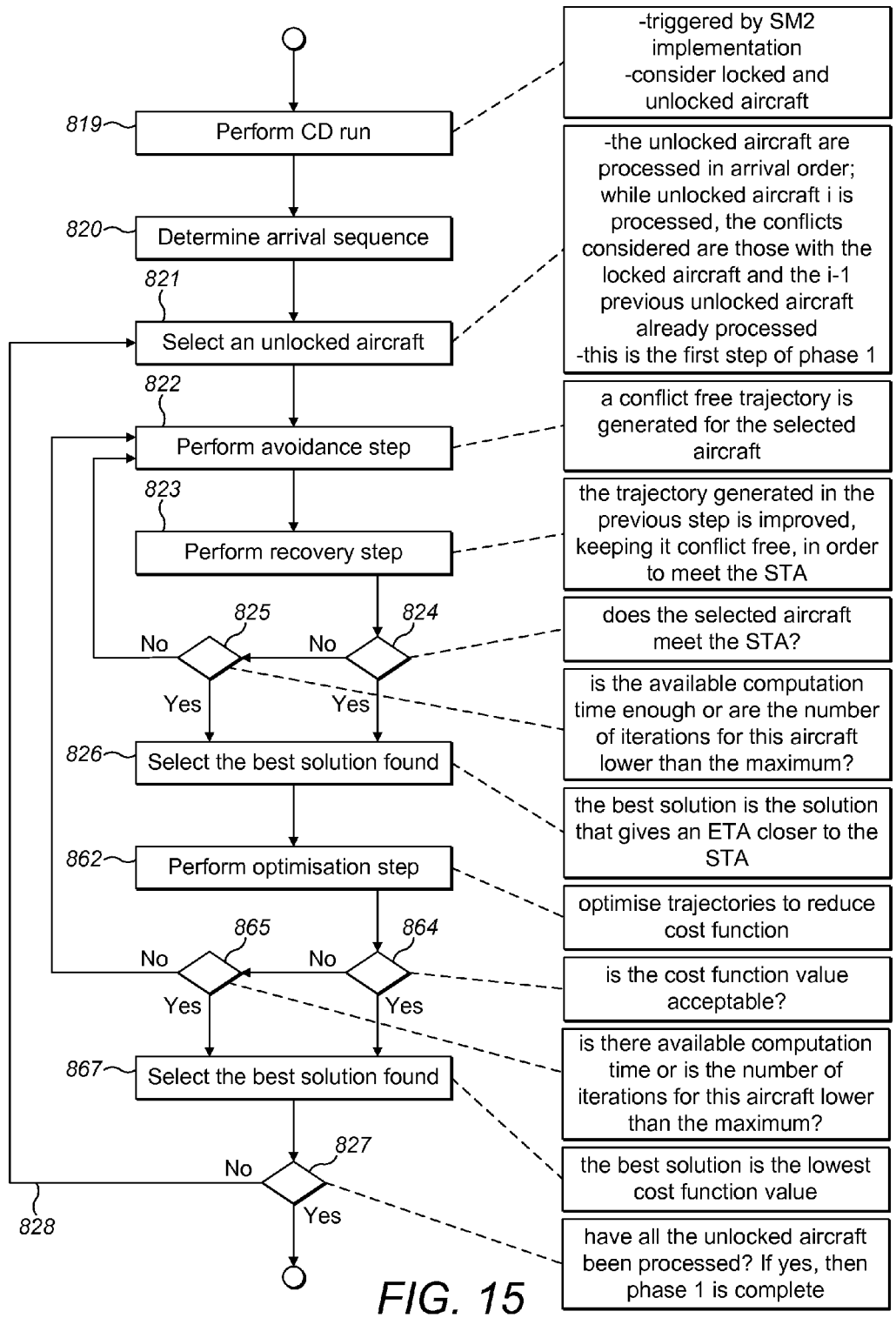
FIG. 15 is a flow chart representation of the method of conflict resolution of FIG. 14.

The first two steps of avoidance 804 and recovery 805 may be performed as described above. Hence steps 819 to 826 of FIG. 15 correspond to steps 819 to 826 of FIG. 12. After step 826, where the best revised aircraft intent data 28b is selected at the end of the recovery step 805, the optimisation step 802 is performed as shown at 864.

In this optimisation step 864, it is the deviation of the revised trajectory from the user-preferred trajectory that is considered. That is, the deviation of the revised trajectory from the user preferred trajectory is minimised, while keeping its revised time of arrival fixed and ensuring conflicts do not arise. As for the avoidance 804 and recovery 805 steps, conflicts with locked aircraft 16 and the i−1 previously processed unlocked aircraft 16 only are considered. The revision of the aircraft intent data 28 may be subject to ensuring equations (13) to (17) are met.

Once the optimisation step 862 is complete, the resulting revised aircraft intent data 28b is checked to see if the revised trajectory has an acceptable cost function value, as shown at 864. In this example, the cost function will be a measure of how much the revised trajectory deviates from the user preferred trajectory. A value may be set for the deviation to be deemed acceptable.

If the cost function value is acceptable, the method continues to step 867. If the cost function is found to be unacceptable, the method continues to step 865.

A further test is made at step 865 to determine whether a further iteration of the avoidance step 804 should be performed. This is determined according to the remaining available computation time and whether a maximum number of iterations through steps 822 to 864 have been performed.

If a further iteration is available, avoidance step 822 is repeated. This ensures that a new starting random trajectory xi is generated that can act as a new starting point for the recovery 805 and optimization 802 processes that will hopefully allow the user preferred time of arrival to be met and an optimized trajectory to be realized that yields an acceptable cost function value.

Eventually, the method will proceed to step 867 where the aircraft intent data 28b corresponding to the best solution found during the iterations is selected. Then, the method continues to step 827 where, as per the method of FIG. 12, either the next unlocked aircraft 16 is processed or the method ends if all unlocked aircraft 16 have been processed.

Variations

It will be clear to the skilled person that modifications may be made to the embodiments described above without departing from the scope of the disclosure.

For example, the present disclosure enjoys particular benefit when applied to air traffic management dealing with the most challenging scenario of predominantly converging paths such as terminal arrivals. Nonetheless, the present disclosure will of course also bring benefits to less challenging environments like diverging paths as for terminal departures and also crossing paths.

It will be appreciated that the location of parts of the present disclosure may be varied. For example, trajectories may be calculated by ground-based or air-based systems. For example, the air traffic management may be ground-based, but need not necessarily be so. The air traffic management need not be centralized. For example, a distributed air-based system could be possible.

Different air traffic management may cooperate and share information. For example, air traffic management having responsibility for adjacent airspaces may pass trajectory information for aircraft anticipated to cross between the adjacent airspaces.

The invention claimed is:

1. A computer implemented method of managing airspace through which a plurality of aircraft are flying, comprising:
    obtaining user-preferred aircraft intent data of the aircraft that describe unambiguously the user-preferred trajectories of the aircraft through the airspace;
    obtaining time constraints for at least some of the aircraft, each time constraint comprising a user-preferred time of arrival at a common location;
    calculating the corresponding user-preferred trajectories from the user-preferred aircraft intent data;
    calling an initial conflict detection procedure comprising comparing the calculated user-preferred trajectories to identify a plurality of conflicts between user-preferred trajectories, and identifying a plurality of conflicted aircraft predicted to fly the conflicting trajectories;
    grouping the plurality of conflicts into a conflict dependent network;
    selecting resolution actions for a set of the plurality of conflicted aircraft within a given conflict dependent network from a set of joint candidate resolution strategies derived from a set of predefined joint candidate resolution patterns;
    gathering all joint candidate resolution patterns for each conflict dependent network;
    selecting a most equitable joint candidate resolution pattern for each conflict dependent network;
    transmitting to the plurality of conflicted aircraft the most equitable joint candidate resolution pattern; and
    ordering the plurality of conflicted aircraft to follow the most equitable joint candidate resolution pattern.

2. The method of claim 1, further comprising:
    calling an initial avoidance procedure comprising revising the user-preferred aircraft intent data of the plurality of conflicted aircraft in a way that is configured to achieve the primary objective of resolving conflicts; and
    calling a recovery procedure comprising determining if the user-preferred times of arrival are met by the revised trajectories and, if not, further revising the revised aircraft intent data of the associated aircraft in a way that is configured to achieve a secondary objective of meeting the time constraints.

3. The method of claim 2, comprising:
    ordering the aircraft according to their user-preferred times of arrival, in order of increasing lateness of time of arrival;
    processing each aircraft from the list in turn, the processing of each aircraft comprising:
        determining if the aircraft is conflicted; and
        if the aircraft is conflicted, calling the initial avoidance and recovery procedures.

4. The method of claim 3, further comprising a further conflict detection procedure and a further avoidance procedure, wherein:
    the further conflict detection procedure comprises:
        comparing calculated trajectories, including both the revised trajectories of aircraft subject to revised aircraft intent data and the user-preferred trajectories of the aircraft not subject to revised aircraft intent data, to identify any conflicts between trajectories; and
        if conflicts are identified during the further conflict detection procedure, identifying the still-conflicted aircraft and calling the further avoidance procedure or
        if conflicts are not detected during the further conflict detection procedure, continuing to call the recovery procedure; and
    the further avoidance procedure comprises:
        revising the user-preferred aircraft intent data of one or more still-conflicted aircraft in at least a partially random way, calculating the corresponding revised trajectories and calling a further round of the further conflict detection procedure.

5. The method of claim 4, wherein the processing of each aircraft comprises:
    calling the initial avoidance procedure and revising the user-preferred aircraft intent data of the aircraft in at least a partially random way, calculating the corresponding revised trajectory from the revised aircraft intent data, and calling the further conflict detection procedure;
    calling the recovery procedure and determining if the user-preferred times of arrival are met by the revised trajectories and, if not, further revising the revised aircraft intent data of the associated aircraft in a way that minimizes the difference between the revised time of arrival and the user-preferred time of arrival and calling the further conflict detection procedure.

6. The method of claim 5, wherein the further conflict detection procedure comprises:
    identifying any conflicts between trajectories by comparing the revised trajectory of the aircraft currently being processed with the calculated trajectories, including both the revised trajectories of aircraft subject to revised aircraft intent data and the user-preferred trajectories of the aircraft not subject to revised aircraft intent data, of conflict-free aircraft and only the conflicted aircraft already processed.

7. The method of claim 6, the further conflict detection procedure further comprises:
    an order of arrival check procedure comprising identifying order of arrival errors by comparing the revised trajectory of the aircraft currently being processed with the calculated trajectory of the preceding aircraft to identify instances where the aircraft currently being processed is predicted to arrive at the common location before the preceding aircraft; and
    if a conflict and/or an order of arrival error is identified during the further conflict detection procedure, calling the further avoidance procedure
    or
    if a conflict and an order of arrival error is not detected during the further conflict detection procedure, continuing to call the recovery procedure or, if the further conflict detection procedure was called by the recovery procedure, continuing to the step of transmitting revised trajectories.

8. The method of claim 5, comprising revising aircraft intent data using a randomly generated parameter such as speed, altitude or position.

9. The method of claim 8, wherein the predefined joint candidate resolution patterns include templates that define:

increasing speed, decreasing speed, shortening a trajectory by removing a waypoint, lengthening a trajectory by adding a waypoint, increasing altitude and decreasing altitude.

10. The method of claim 9, comprising:
determining if a conflict arises because the aircraft being processed is catching up on the preceding aircraft or is being caught up by the following aircraft, and
if the aircraft being processed is catching up the preceding aircraft, randomly selecting a candidate resolution strategy from templates that define decreasing speed and lengthening a trajectory by adding a waypoint,
or
if the aircraft being processed is being caught up by the following aircraft, randomly selecting a candidate resolution strategy from templates that define increasing speed, and shortening a trajectory by removing a waypoint.

11. The method of claim 1, comprising an additional, optimisation procedure comprising further revising revised aircraft intent data of the plurality of aircraft to minimize a cost function calculated from revised aircraft intent data, and calling the further conflict detection procedure.

12. The method of claim 11, comprising performing the optimisation procedure as a global function that considers all revised aircraft data globally.

13. The method of claim 12, wherein the cost function is calculated from all revised aircraft intent data and is a measure of how unfairly or inequitably deviations in revised trajectories are spread amongst aircraft subject to revised aircraft intent data.

14. The method of claim 3, wherein processing of each aircraft comprises an additional, optimisation procedure comprising further revising the revised aircraft intent data of the aircraft being processed to minimize a cost function calculated from revised aircraft intent data.

15. The method of claim 12 wherein the cost function is a measure of how much the revised trajectory deviates from the user-preferred trajectory.

16. The method of claim 15, wherein the cost function is a measure of how much the lateral path defined by the revised aircraft intent data deviates from the lateral path defined by the user-preferred aircraft intent data.

17. The method of claim 1, wherein the airspace is a terminal airspace around an airport and the time constraint comprises a user-preferred time of arrival at the airport.

18. A system for managing airspace through which a plurality of aircraft are flying, the system comprising:
a computer apparatus;
a non-transitory computer readable medium comprising instructions stored thereon, that when executed by the computer apparatus, causes the computer apparatus to:
obtain user-preferred aircraft intent data of the aircraft that describe unambiguously the user-preferred trajectories of the aircraft through the airspace;
obtain time constraints for at least some of the aircraft, each time constraint comprising a user-preferred time of arrival at a common location;
calculate the corresponding user-preferred trajectories from the user-preferred aircraft intent data;
call an initial conflict detection procedure comprising comparing the calculated user-preferred trajectories to identify a plurality of conflicts between user-preferred trajectories, and identifying a plurality of conflicted aircraft predicted to fly the conflicting trajectories;
group the plurality of conflicts into a conflict dependent network;
select resolution actions for a set of the plurality of conflicted aircraft within a given conflict dependent network from a set of joint candidate resolution strategies derived from a set of predefined joint candidate resolution patterns;
gather all joint candidate resolution patterns for each conflict dependent network;
calling an initial conflict resolution procedure comprising revising the user preferred
select a most equitable joint candidate resolution pattern for each conflict dependent network;
transmit to the plurality of conflicted aircraft the most equitable joint candidate resolution pattern; and
order the plurality of conflicted aircraft to follow the most equitable joint candidate resolution pattern.

19. The system of claim 18 further comprising:
calling an initial avoidance procedure comprising revising the user-preferred aircraft intent data of a plurality of conflicted aircraft in a way that is configured to achieve the primary objective of resolving conflicts; and
calling a recovery procedure comprising determining if the user-preferred times of arrival are met by the revised trajectories and, if not, further revising the revised aircraft intent data of the associated aircraft in a way that is configured to achieve the secondary objective of meeting the time constraints.

20. A non-transitory computer readable medium having stored thereon a computer program for managing airspace through which a plurality of aircraft are flying, the computer program comprising instructions that when executed by a computer apparatus causes the computer apparatus to:
obtain user-preferred aircraft intent data of the aircraft that describe unambiguously the user-preferred trajectories of the aircraft through the airspace;
obtain time constraints for at least some of the aircraft, each time constraint comprising a user-preferred time of arrival at a common location;
calculate the corresponding user-preferred trajectories from the user-preferred aircraft intent data;
call an initial conflict detection procedure comprising comparing the calculated user-preferred trajectories to identify a plurality of conflicts between user-preferred trajectories, and identifying a plurality of conflicted aircraft predicted to fly the conflicting trajectories;
group the plurality of conflicts into a conflict dependent network;
select resolution actions for a set of the plurality of conflicted aircraft within a given conflict dependent network from a set of joint candidate resolution strategies derived from a set of predefined joint candidate resolution patterns;
gather all joint candidate resolution patterns for each conflict dependent network;
select a most equitable joint candidate resolution pattern for each conflict dependent network;
transmit to the plurality of conflicted aircraft the most equitable joint candidate resolution pattern; and
order the plurality of conflicted aircraft to follow the most equitable joint candidate resolution pattern.

* * * * *